(12) United States Patent
Cao et al.

(10) Patent No.: US 12,131,648 B2
(45) Date of Patent: Oct. 29, 2024

(54) METHODS AND APPARATUS RELATED TO A PLATOONING GROUP

(71) Applicant: QUALCOMM Incorporated, San Diego, CA (US)

(72) Inventors: Yiqing Cao, Beijing (CN); Yan Li, Beijing (CN); Shuping Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 867 days.

(21) Appl. No.: 17/255,425

(22) PCT Filed: May 15, 2019

(86) PCT No.: PCT/CN2019/086982
§ 371 (c)(1),
(2) Date: Dec. 22, 2020

(87) PCT Pub. No.: WO2020/007127
PCT Pub. Date: Jan. 9, 2020

(65) Prior Publication Data
US 2021/0134159 A1    May 6, 2021

(30) Foreign Application Priority Data
Jul. 5, 2018 (WO) ................ PCT/CN2018/094620

(51) Int. Cl.
*G08G 1/00* (2006.01)
*H04W 4/08* (2009.01)
(Continued)

(52) U.S. Cl.
CPC ................ *G08G 1/22* (2013.01); *H04W 4/08* (2013.01); *H04W 4/40* (2018.02); *H04W 12/02* (2013.01); *H04W 48/16* (2013.01)

(58) Field of Classification Search
CPC ............ G08G 1/22; G08G 1/092; G08G 1/00; H04W 4/08; H04W 4/40; H04W 12/02;
(Continued)

(56) References Cited

U.S. PATENT DOCUMENTS 11,242,051 B1 *   2/2022   Konrardy ........ B60W 30/18163
11,501,646 B2 *  11/2022   Kumar .................... H04W 4/46
(Continued)

FOREIGN PATENT DOCUMENTS

CN         105702018 A      6/2016
CN         106408930 A      2/2017
(Continued)

OTHER PUBLICATIONS

Supplementary European Search Report—EP19830734—Search Authority—The Hague—Feb. 10, 2022.
(Continued)

*Primary Examiner* — Shardul D Patel
(74) *Attorney, Agent, or Firm* — Arent Fox, LLP

(57) ABSTRACT

Various aspects related to a platooning group in a V2V and/or V2X network are described. In an aspect of the disclosure, a method, a computer-readable medium, and an apparatus are provided. The apparatus maybe a first UE configured to transmit a first message to announce an existence of the platooning group. In one configuration, the first UE may receive, in response to the first message, a second message indicating a request to join the platooning group from a second UE. The first UE may allow or deny the second UE to join the platooning group based on the second message. In another aspect, the apparatus maybe a first UE configured to receive a first message indicating an existence of a platooning group. The first UE may be configured to
(Continued)

decode a portion of the first message, and determine whether the platooning group is a private group based on the decoding.

30 Claims, 13 Drawing Sheets

(51) Int. Cl.
 *H04W 4/40* (2018.01)
 *H04W 12/02* (2009.01)
 *H04W 48/16* (2009.01)
(58) Field of Classification Search
 CPC ....... H04W 48/16; H04W 4/027; H04W 4/46; H04L 67/12
 USPC ........................................................ 701/117
 See application file for complete search history.

(56) References Cited

U.S. PATENT DOCUMENTS

| | | | | |
|---|---|---|---|---|
| 2010/0256852 | A1* | 10/2010 | Mudalige | G08G 1/164 701/24 |
| 2014/0328241 | A1 | 11/2014 | Subramanian et al. | |
| 2017/0158196 | A1 | 6/2017 | Park et al. | |
| 2018/0146471 | A1* | 5/2018 | Xu | H04W 4/08 |
| 2019/0079659 | A1* | 3/2019 | Adenwala | H04W 4/026 |
| 2019/0141487 | A1 | 5/2019 | Jiang et al. | |
| 2020/0312154 | A1* | 10/2020 | Mondello | H04W 4/40 |
| 2020/0342766 | A1* | 10/2020 | Gundavelli | H04W 4/40 |
| 2021/0264793 | A1* | 8/2021 | Shuman | H04W 52/327 |

FOREIGN PATENT DOCUMENTS

| | | |
|---|---|---|
| CN | 106790700 A | 5/2017 |
| CN | 106853827 A | 6/2017 |
| WO | 2016206465 A1 | 12/2016 |
| WO | 2018010139 A1 | 1/2018 |

OTHER PUBLICATIONS

3rd Generation Partnership Project: "Study on Communication for Automation in Vertical Domains", 3GPP TR 22.804 V2.0.0 May 31, 2018 (May 31, 2018), pp. 1-188.
International Search Report and Written Opinion—PCT/CN2019/086982—ISA/EPO—Aug. 15, 2019.
International Search Report and Written Opinion—PCT/CN2018/094620—ISA/EPO—Apr. 8, 2019.

* cited by examiner

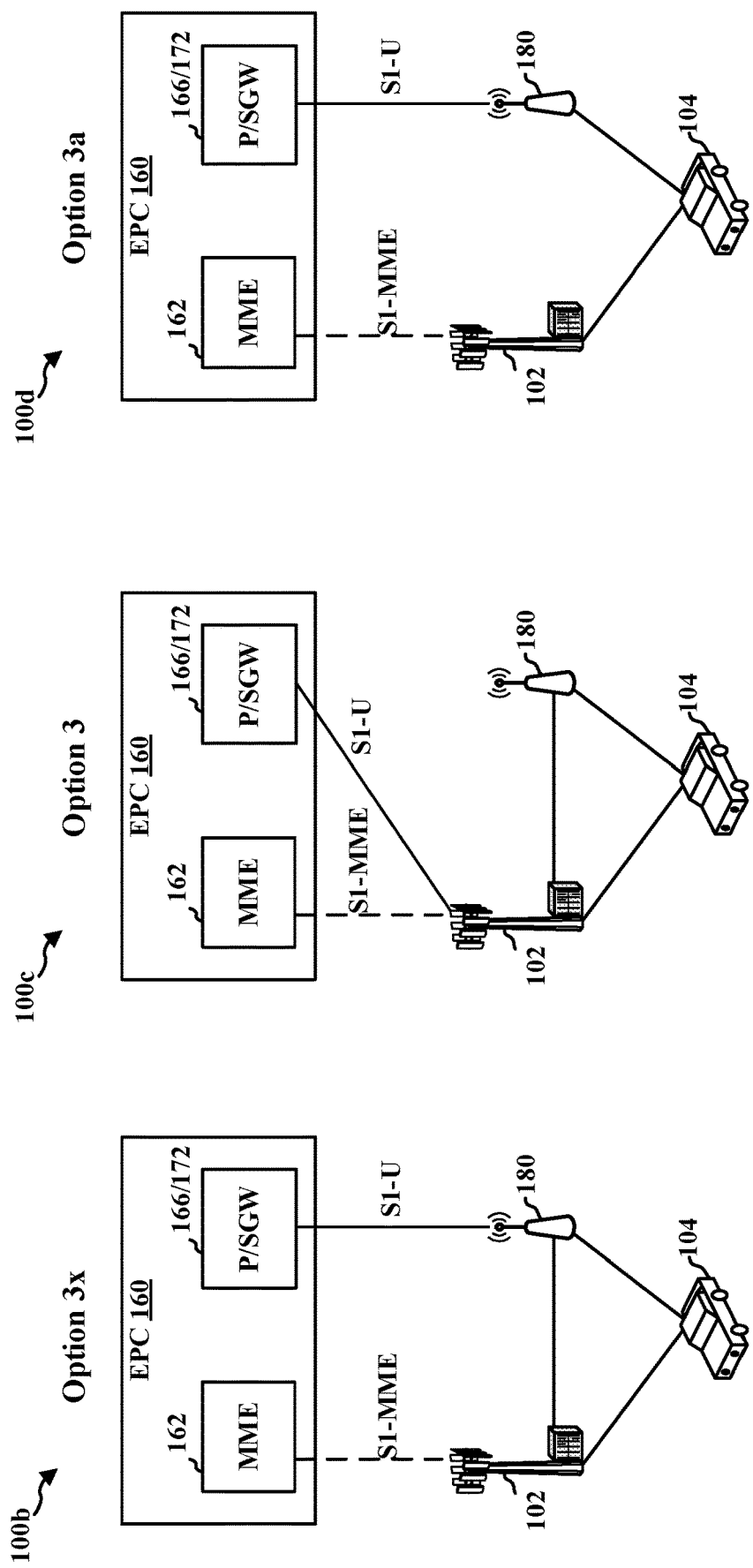

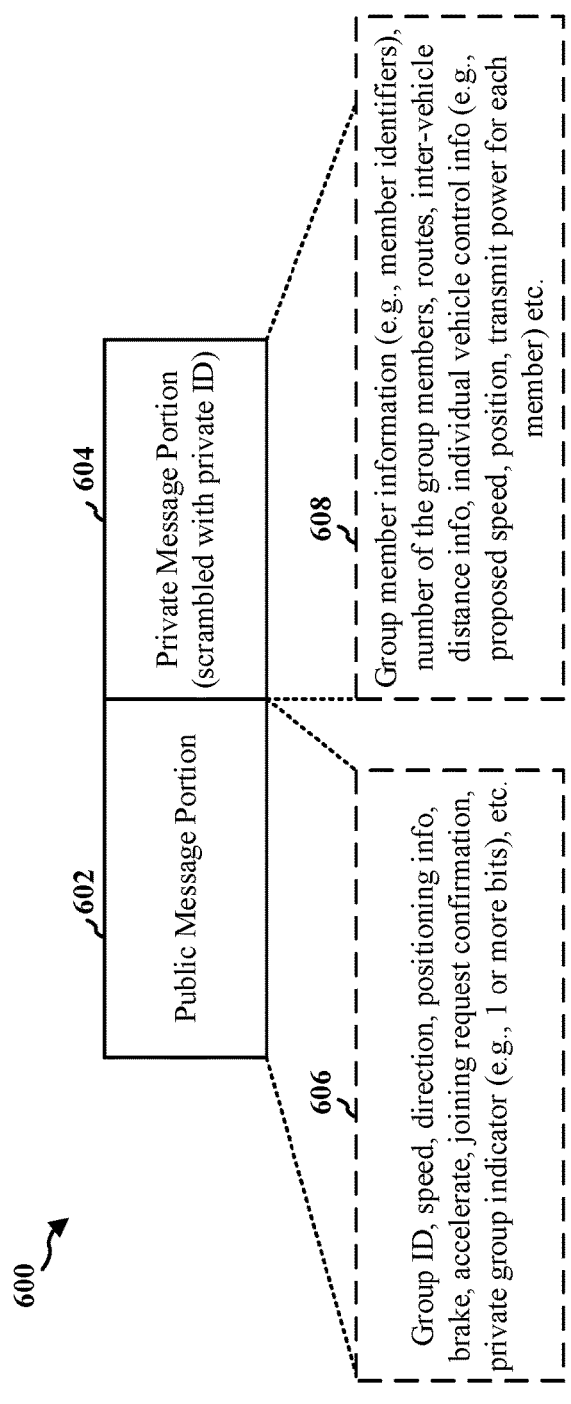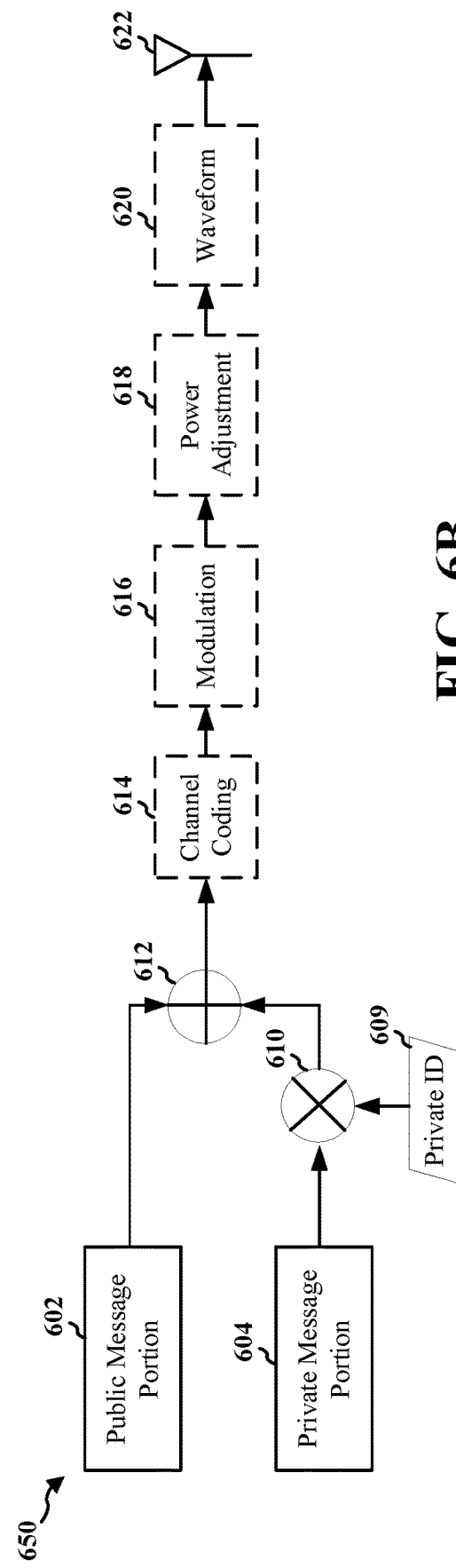
FIG. 6A
FIG. 6B

METHODS AND APPARATUS RELATED TO A PLATOONING GROUP

CROSS REFERENCE TO RELATED APPLICATION(S)

This application is a national stage entry of PCT Application No. PCT/CN2019/086982, entitled "METHODS AND APPARATUS RELATED TO A PLATOONING GROUP" and filed on May 15, 2019, which claims priority to International PCT Application No. PCT/CN2018/094620, entitled "METHODS AND APPARATUS RELATED TO A PLATOONING GROUP" and filed on Jul. 5, 2018, all of which are expressly incorporated by reference herein in their entirety.

TECHNICAL FIELD

The present disclosure relates generally to communication methods and systems, and more particularly, to methods and apparatus related to a group of devices in a wireless communication system including, e.g., a vehicular communication network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available System resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first UE (e.g., a vehicle in a vehicle-to-vehicle (V2V) vehicle-to-everything (V2X) network and/or Device to Device (D2D) network) which may be the head of a platooning group. The first UE may be configured to transmit a first message to announce an existence of the platooning group. In some configurations, ate first UE may be further configured to receive, in response to the first message, a second message indicating a request to join the platooning group from a second UE (e.g., another vehicle). In some configurations, the first UE may be further configured to allow or deny the second UE to join the platooning group based on the second message.

In another aspect of the disclosure, a method, a computer-readable medium, and an apparatus are provided. The apparatus may be a first UE (e.g., a vehicle). The first UE may be configured to receive a first message indicating an existence of a platooning group, e.g., from a head of the platooning group. In some configurations, the first UE may be further configured to decode a portion of the first message. In some configurations, the first UE may be further configured to determine whether the platooning group is a private group based on the decoding. Various additional aspects and features are described in the following detailed description.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 1B-1D are diagrams illustrating examples of some architecture options that may be used with the access network of FIG. 1A.

FIG. 6A illustrates an example structure of an example announcement message that may be transmitted to indicate an existence of a private platooning group.

FIG. 6B illustrates an example of generation of an announcement message and transmission.

DETAILED DESCRIPTION

Figure 1A:
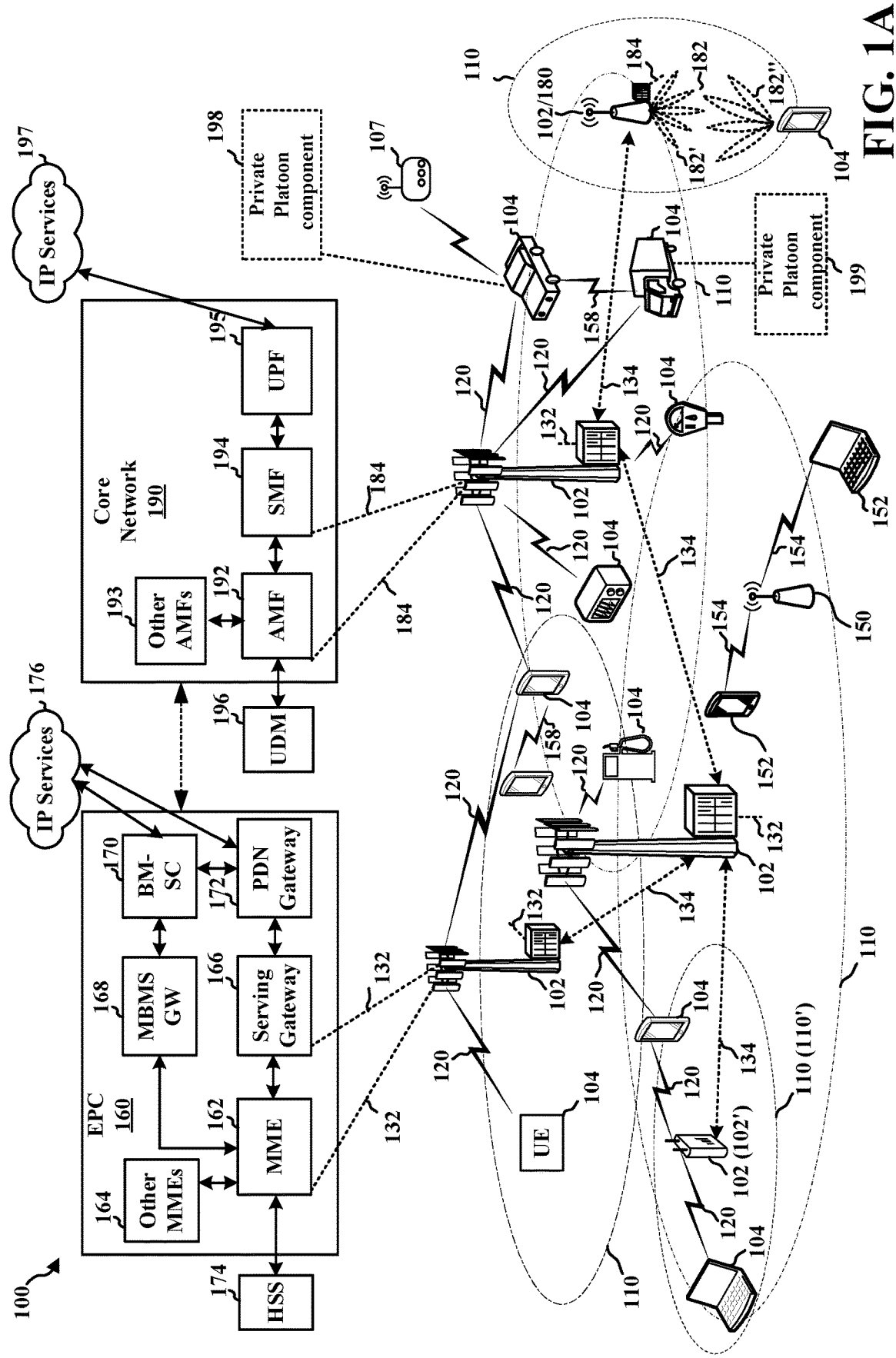
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding, of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arras (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description languages or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRA)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions handover, dual connectivity), inter-cell interference coordination, connection setup and release, load balancing distribution for non-access stratum (NAS) messages, NAS node selection, synchronization, radio access network (RAN) sharing, multimedia broadcast Multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other.

Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1A illustrates that a base station 180 may transmit a beamformed signal to the UI 104 in one or more transmit directions 182'. The UE 104 may receive the beamformed signal front the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104.

The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2.

Referring again to FIG. 1A, in certain aspects, a first device (e.g., such as UE 104) may comprise a private platoon component 198 configured to announce an existence of a platooning group to other UE s via a first message. The first device may be a vehicle or a device for use in connection with a vehicle. The first device may be a head of the platooning group for which the existence/presence is announced. A second UE (e.g., another UE 104 which may be a vehicle or a device installed in a vehicle) may comprise a private platoon component 199 configured to receive the first message and become aware of the existence of the group, and may decide whether to join the platooning group. Various additional aspects and details of the disclosed methods and apparatus are discussed infra with respect to FIGS. 4-11. As discussed infra, various features of the methods described herein support announcements related to a platooning group in V2V and/or V2X networks and allow one or more UEs to become aware of the group and join if desired.

Figures 5A, 5B:
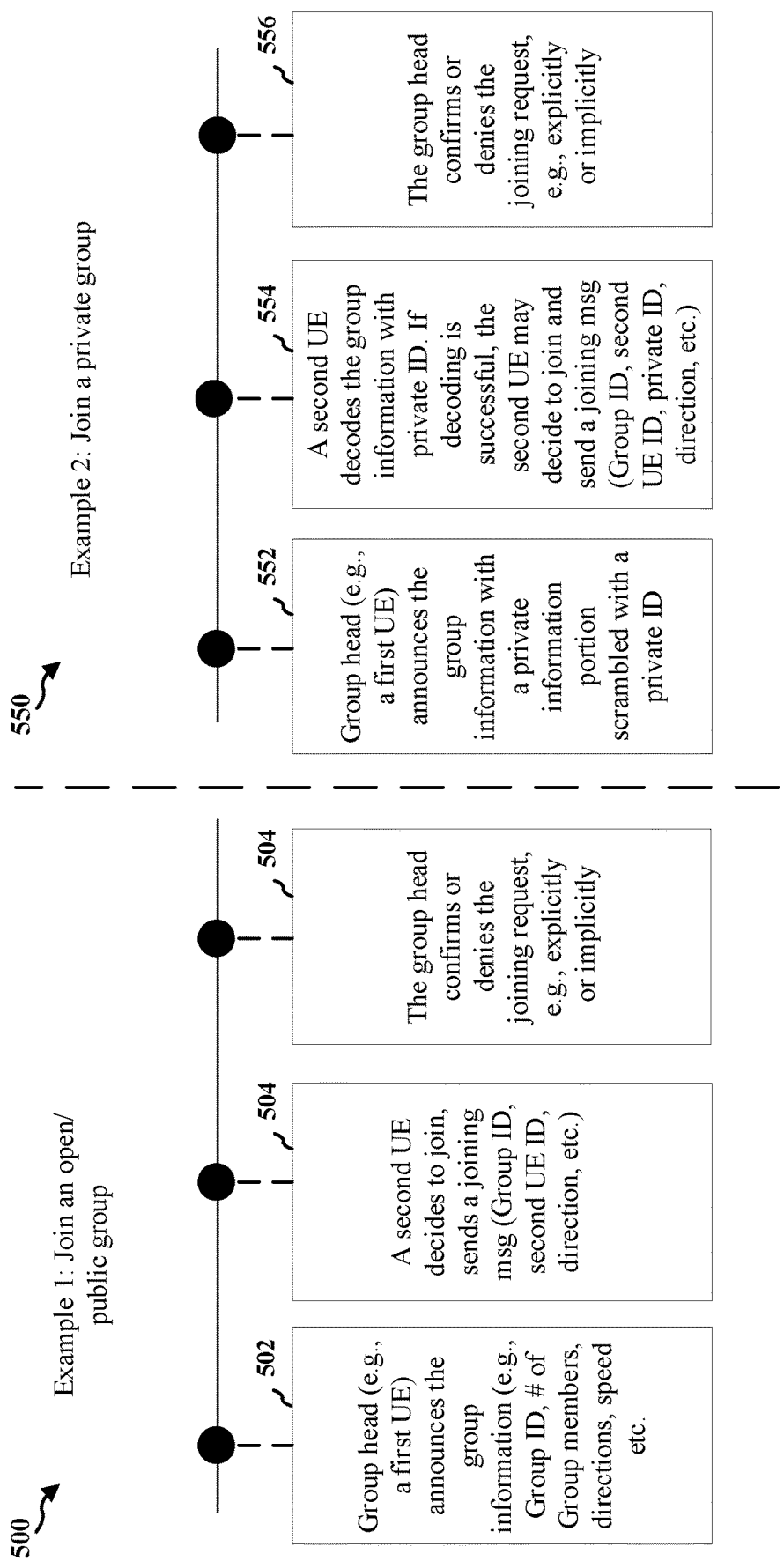
FIG. 5A illustrates an example process via which an individual may discover the existence of a public platooning group and join the group if desired.
FIG. 5B illustrates an example process via which an individual UE may discover the existence of a private platooning group and join the group if desired.

FIGS. 1B-1D are diagrams 100b, 100c, and 100d illustrating examples of non-standalone (NSA) architecture deployment which may be used in the access network of 100 of FIG. 1A. In some configurations, the UE 104 may simultaneously connect to a first base station (e.g., eNB 102) via a first radio access technology (RAT) and a second base station (e.g., gNB 180) via a second RAT, as shown in FIGS. 5A-5C. For example, the first RAT may comprise and/or support LTE wireless access technology, and the second RAT may comprise and/or support 5G NR wireless access technology.

FIG. 1B illustrates a first option (e.g., option 3x) of an NSA architecture deployment that may be used in the access network 100 in some configurations. In this option, base station 180 (e.g., gNB) may have an S1-U connection to the core network (e.g., EPC 160) via the SGW 166/PGW 172. Base station 102 (e.g., eNB) may have an S1-MME connection to the EPC 160 via the MME 162. This configuration may comprise a DC, split bearer. Thus, with this option, the data may go through both the first base station 102 via LTE and the second base station 180 via 5G NR. The data may combine, or merge at the second base station 180, because the dual connectivity split bearer is anchored at the second base station 180. The consolidated data may be sent to the core network EPC 160 by the second base station 180.

FIG. 1C illustrates a second option (e.g., option 3) of the NSA architecture deployment that may be used in the access network 100 in some configurations. In this option, data may similarly go through both the first base station 102 via LTE and the second base station 180 via 5G NR. However, in this example, the data may combine, or merge at the first base station 102 because the dual connectivity split bearer is anchored at the first base station 102. The consolidated data may be sent to the core network EPC 160 by the first base station 102.

FIG. 1D illustrates a third option (e.g., option 3a) of the NSA architecture deployment that may be used in the access network 100 in some configurations. In this option, the data may go through the second base station 180, and the second base station 180 may send the data the core network EPC 160.

Figure 2:
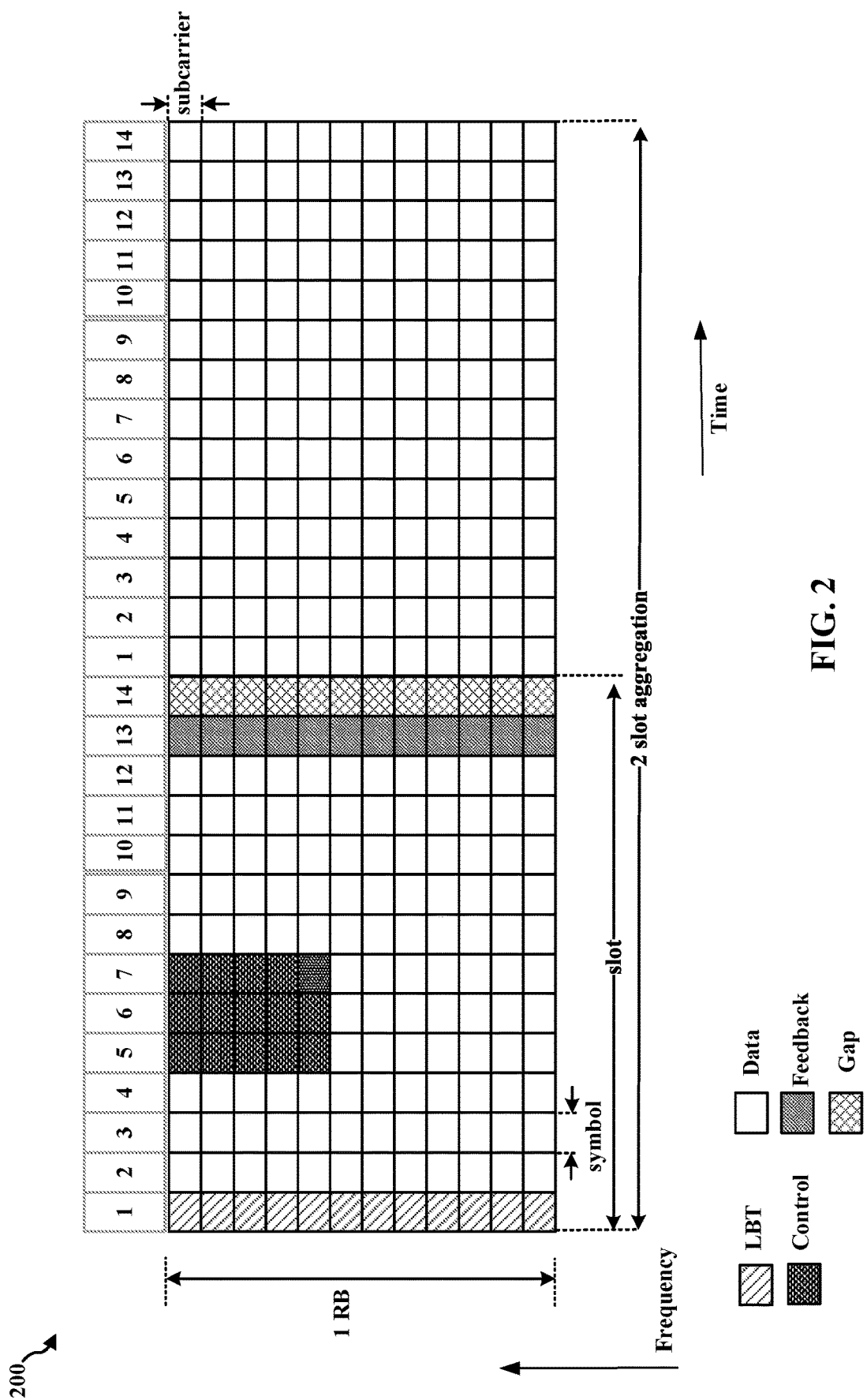
FIG. 2 illustrates an example frame structure.

FIG. 2 is a diagram 200 illustrating an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each tune slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DM-RS). The control information may comprise Sidelink Control Information (SCI). At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slot. The aggregated number of slots may also be larger than two. When slots are aggregated, the symbols used for feedback and/or a gap symbol may be different that for a single slot.

Figure 3:
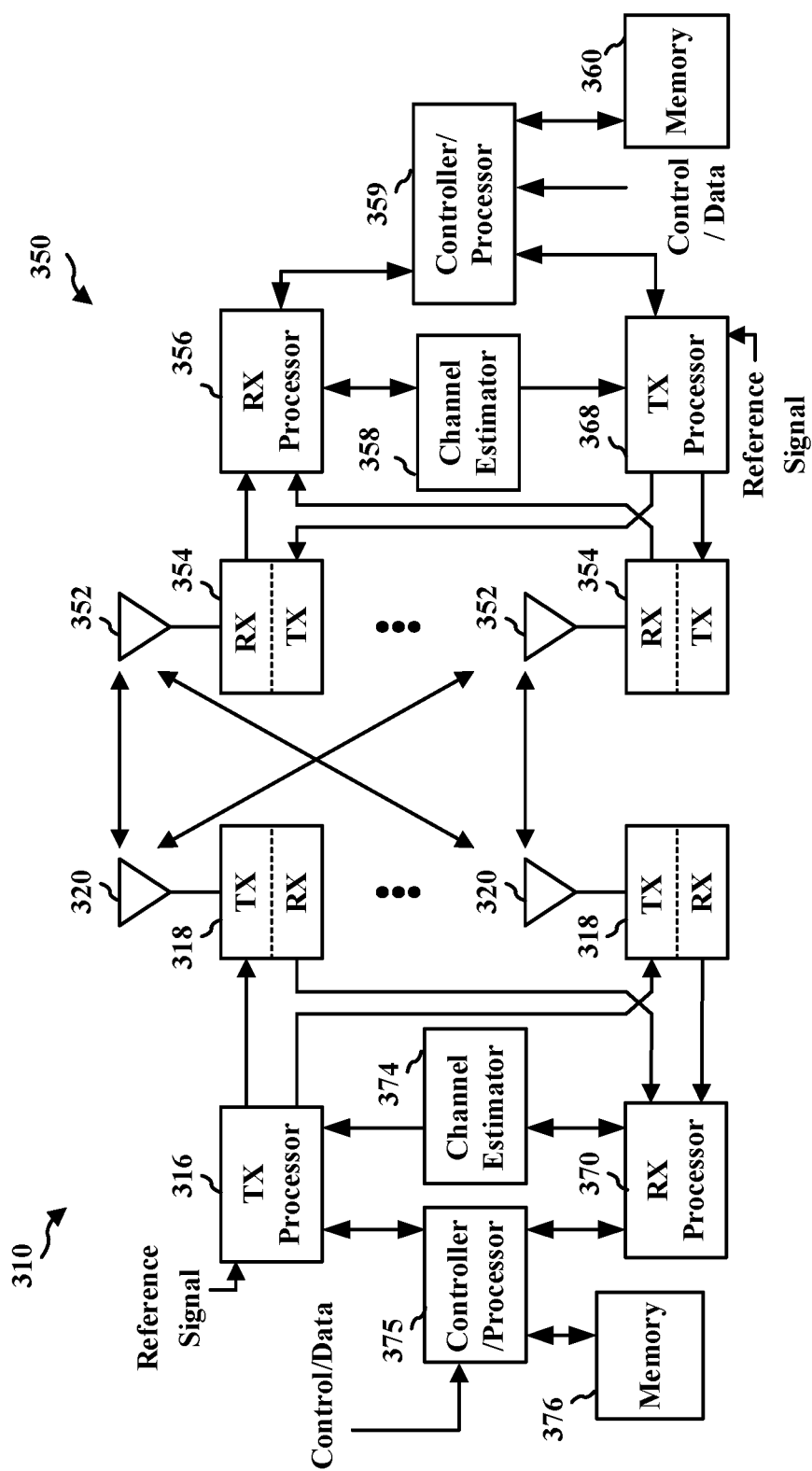
FIG. 3 is a diagram illustrating an example of a base station and UE in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing suctions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK) quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX, processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information is (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, and the controller/processor 375 may be configured to perform aspects in connection with 198 and/or 199 of FIG. 1.

Various features and aspects related to joining a platooning group (also simply referred to as the platoon) and announcements related to the platooning group in a wireless communication system (e.g., including vehicular communication systems such as vehicle-to-vehicle (V2V), vehicle-to-everything (V2X) and/or enhanced V2X (eV2X) networks) are described. Platooning may be described as operating a group of vehicles in a closely linked manner such that the vehicles may move in a coordinated manner as if connected by virtual strings. To maintain distance between the vehicles, the vehicles may share status information such as speed, heading and intentions such as braking, acceleration, etc. By use of platooning, the distances between vehicles may be reduced, overall fuel consumption may be lowered (and thus fuel efficiency may be improved), and the number of needed drivers may be reduced. In addition, an overall user experience may be improved with a sense of traveling in a group and being connected with others.

When a platoon is formed and operational, it may be helpful for a vehicle that does not belong to the platoon to be aware of the existence of the platoon. Without any information about the existence or presence of the platoon, it is possible that the vehicle may move into the middle of the platoon and disrupt the operation of the platoon. Thus, the existence of the platoon may be made known to other vehicles beyond the communication range among vehicles of the same platoon.

In accordance with the described methods and features thereof, a head (e.g., a user equipment (UE)) of a platooning group (e.g., a public or private platooning group) may use various messages described herein to announce the existence of the platooning group so that various other UEs (e.g., other vehicles) which may not belong to the platooning group can be aware of the presence of the platooning group. Such an announcement may help preventing disruption of the operation of the platooning group because the other vehicles hearing the announcement become aware of the platooning group and may avoid moving into the group (e.g., without approval).

For a private platooning group (e.g., a closed group such as a tour group, family group, public safety group, etc.), it may not be desirable to announce private information corresponding to members of the private platooning group (such as identifiers of the group members, number of group members, traveling routes, etc.). To address such a concern and improve security of private information, in accordance with aspects disclosed herein, a head of a private platooning group may generate an announcement message having a public message portion and private message portion. The announcement message may indicate the existence of the private group while maintaining the privacy of certain information. The public message portion may comprise basic information (e.g., such as group identifier (ID), speed, direction etc.) that may be needed for other devices to be aware of the presence of the platooning group, whereas the private message portion may include the private information (e.g., group member IDs, number of group members, traveling routes, etc.). The public message portion may further include information identifying the private group. While the public message portion may be accessed (e.g., decoded) by the various devices that may receive the announcement message, the private message portion may be generated to limit reception of the private message portion to the group members and/or an allowed set of UEs may be able to decode the private message portion. For example, in one configuration, the private message portion may be generated by scrambling the private information with a private ID, and the UEs in possession of the private ID may be able decode the private message portion. In one configuration, the private ID may be known to (e.g., preconfigured in) the group members and/or an allowed set of devices. In another configuration, the private ID may be distributed via scheduling or an application layer message. In this manner, other non-member vehicles may be made aware of the existence of the private group without giving away the private information if the platoon.

There may be a number of UEs that may receive the announcement message broadcast by a head of a platooning group (e.g., public or private group). A UE may attempt to decode the received announcement message and determine if the platooning group is public or private, e.g., based on the information in the announcement message. If the platooning group is a public group, and the UE wants to join the platooning group, the UE may send a joining request message to the group head and monitor for an approval or denial. If the platooning group is determined to be a private group (e.g., based on decoding of the public portion of the announcement message in case of a private group), the UE may attempt to decode the private message portion of the announcement message using a known private ID/key. If the decoding succeeds, the UE may determine whether the UE wants to join the private group. If the UE determines to join the private group (e.g., based on interest, user selection and/or a device setting/configuration), the UE may send a joining request message to the group head and monitor for an approval or denial. Various additional aspects and features are discussed infra in more detail.

Figure 4:
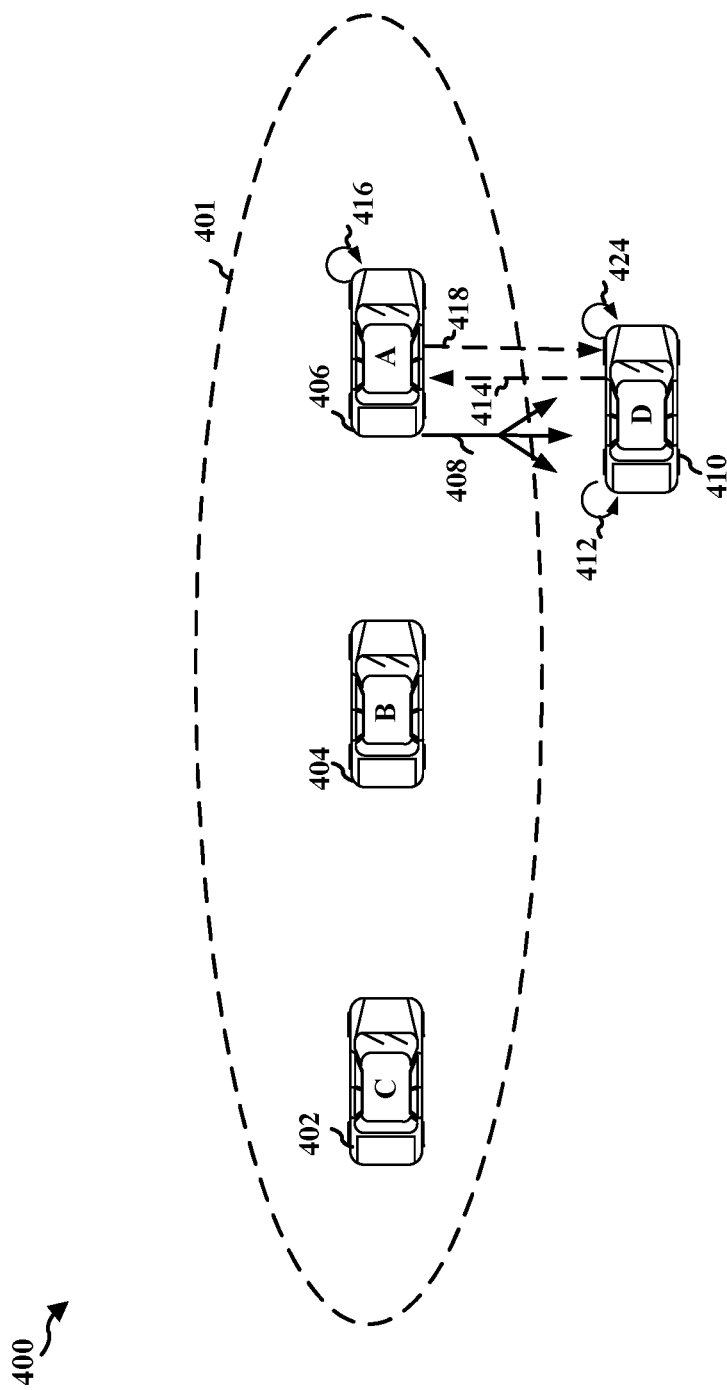
FIG. 4 illustrates an example of a platooning group announcement and joining process, in accordance with one aspect.

FIG. 4 illustrates a diagram 400 of an example showing a platooning group 401 including a plurality of UEs (e.g., vehicles) and at least one other individual UE 410 that may hear group related announcements and decide whether to join the group 401. The platooning group (also simply referred to as the platoon) 401 may include UEs 402, 404, and 406. For discussion purposes, consider that UEs 402 and 404 are members of the platoon 401 and the UE 406 is a member as well as the head of the platoon 401.

As discussed supra, in order to allow other UEs that may not belong to the platoon 401 to be aware of the existence of the platoon 401, information indicating the existence of the platoon 401 may be transmitted by the head of the platoon 401. As illustrated in the example of FIG. 4, in accordance with one aspect the UE 406 (e.g., the head of the platoon 401) may transmit (e.g., broadcast) an announcement message 408 to indicate the existence/presence of the platooning group 401. The platooning group 401 may be an open/public group which may be open to other UEs, or a private group (e.g., a tour group, family group, public safety group etc.) which may be limited to an allowed set of UEs.

If the platoon 401 is a public group, the announcement message 408 may be a public message that may be accessed by members (e.g., UEs 402 and 404) as well as non-members (e.g., UE 410). In such a configuration, the announcement message 408 may include both the basic information regarding the platoon 401 (e.g., group ID, speed, direction, etc.) that may be needed by others to be aware of the existence of the platoon 401, as well as group member specific information (such as individual group member IDs, a number of group members, routes, etc.) as publicly accessible information.

In another configuration in which the platoon 401 is a private group, the announcement message 408 may be generated by the head UE 406 with two portions, e.g. a public message portion that may be accessed by members (e.g., UEs 402 and 404) as well as non-members (e.g., UE 410), and a private message portion that may be accessed by an allowed set of UEs. In such a private platooning group configuration, the public portion of the announcement message 408, which may be accessible to the members and non-members receiving the announcement message 408, may include the basic information regarding the platoon 401 (e.g., group ID, speed, direction, etc.) and information identifying the private group. The private portion of the announcement message 408 may include private information regarding the group (e.g., such as individual group member IDs, a number of group members, traveling routes, etc.) that may be accessed by the allowed set of UEs. For example, the allowed set of UEs may include members of the group 401, and one or more UEs that may be allowed to join the platoon 401 and may have secure information (e.g., such as a private ID or key) corresponding to the platoon 401

(e.g., which may be preconfigured or previously communicated based on a relation or interest between the platoon 401 and the one or more allowed UEs). The private portion of the announcement message 408 may be generated by the head UE 400 by scrambling the private information with a private ID known to the set of allowed UEs for the platooning group 401. Thus, based on the knowledge of the private ID/key, the allowed set of UEs may decode the private portion of the announcement message 408.

For example the platooning group 401 may be a private group, and the UE 410 (while not a current member of the platoon 401) may belong to an allowed set of UEs for the platooning group 401 and thus may possess the private ID/key for decoding the private portion of the announcement message. Upon receiving the announcement message 408, the UE 410 may first decode the public portion of the announcement message 408 to determine whether the platooning group 401 is a private group or a public group. As mentioned supra, in accordance with one aspect, among other pieces of data, the public portion of the message 408 may include information (e.g., 1 or more bits) identifying the private platooning group 401 or otherwise indicating that the platoon 401 is a private group. The UE 410 may then attempt to decode (at 412) the private portion of the announcement message 409. Assuming that the UE 410 belongs to the allowed set of UEs that possess the private alley for decoding the private message portion, the UE 410 may successfully decode the private portion of the message 408. Furthermore, the UE 410 may determine (at 412) whether the UE 410 wants to join the private platoon 401. Again, assuming for discussion purposes that the UE 410 determines to join the private platoon 401 (e.g., based on a UE setting, configuration, and/or user selection), the UE may send a request message 414 as a joining application/request to the head UE 406 to join the platooning group 401. In some configurations, the request message 414 may include, for example, vehicle information such as speed, direction, traveling route of the UE 410, and other information such as group ID of the group 401 that the UE 410 requests to join, and optionally the private ID/key.

Upon receiving the request message 414, the head UE 406 may determine (at 416) whether to allow the UE 410 to join the group 401 or deny the request. In some configurations, the head UE 406 may determine to allow or deny joining of the UE 410 based on the information in the request message 414 and/or other information regarding the UE 410 known to the group head 406. Based on the determination, in some configurations, the head UE 406 may provide (implicitly or explicitly) a response to the UE 410 indicating an approval or denial to join the group 401. For example, in one configuration, the head UE 406 may send an ACK in a response message 418 as a confirmation/approval for the U 410 to join the platoon 401. In one configuration, if an ACK, is not received from the head UE 406 in response to the request message 414, this may be considered as an implicit indication of a denial to join the group 401. In various configurations, an ACK (approval) or a NACK (denial) may be transmitted as a broadcast, multicast, or as a unidirectional message.

While a specific example is discussed above with reference to FIG. 4, it should be appreciated that many variations are possible, and would be readily understood by those of skill in the art.

FIG. 5A illustrates a diagram 500 depicting an example process via which an individual UE may discover the existence of a public platooning group and join the group if desired. The illustrated example merely shows a few basic steps of the process to facilitate an understanding of the proposed concepts. In the illustrated example, at stage 502, a first UE (e.g., group head such as UE 406) of the public platooning group may announce group information. For example, as discussed above in connection with FIG. 4, for a public group, the group head UE 406 may broadcast group information via the announcement message 408 which may be accessible to (e.g., can be decoded by) all UEs that receive the announcement message. In the example of a public platooning group, the group announcement message may include both the basic information regarding the public platoon (e.g., such as group ID, speed, direction, etc.) as well as group member specific information (e.g., such as individual group member IDs, a number of group members, routes, etc.) as publicly accessible information.

In the illustrated example process, at processing stage 504, a second UE (e.g., UE 410) that received the group announcement message may decide to join the platooning group (assuming the second UE is interested in joining the group) and may send a request message (e.g., such as message 414) indicating a request to join the group. In one configuration, the request message may include the group ID, ID of the second UE, speed of the second UE, direction of the second UE, etc.

At processing stage 506, the group head may confirm or deny the request to join from the second UE. In some configurations the confirmation or denial may be implicit. In some other configurations, the confirmation or denial may be explicit. For example, the group head may send a confirmation message, e.g., an ACK, to the second UE in response to the joining request as an indication of an approval to join. Similarly, in the event of denial, in some configurations, the group head may send a denial message, e.g., a NACK, to indicate the denial to join the group. In some configurations, the group head may refrain from sending an approval (ACK) in response to the joining request to implicitly indicate a denial.

FIG. 5B illustrates a diagram 550 depicting an example process, via which an individual UE may discover the existence of a private platooning group and join the group if desired. The illustrated example merely shows a few basic steps of the process to facilitate an understanding of the proposed concepts. In the illustrated example, at stage 552, a first UE (e.g., group head such as UE 406) of the private platooning group may announce group information via an announcement message (e.g., message 412) that includes a public message portion and private message portion. As discussed supra, the private message portion may include private information scrambled with a private ID known to an allowed set of UEs including the group members. In other words, the private message portion may be generated by scrambling the private information (e.g., information corresponding to the group members and/or traveling routes) with the private ID. The public message portion of the announcement message may include basic group related information (e.g., group ID, speed, direction, etc.) and information identifying the private group (e.g., one or more bits indicating that the platooning group is private). The private message portion may include scrambled private information (e.g., including individual group member IDs, a number of group members, traveling routes, etc.). While the public message portion may be accessible to (e.g., can be decoded by) all UEs that receive the announcement message, the private message portion may be decoded by the allowed set of UEs that may possess the private ID/key to descramble the private information.

At processing stage 554, a second UE (e.g., UE 410) that received the group announcement message may decode the public message portion and determine that the announcement message corresponds to a private group. The second UE may be a member of one or more private groups and may possess private IDs/keys. The second UE may attempt to decode the private message portion based on the private IDs/keys that it may possess. If the decoding of the private message portion is successful and the second UE wants to join the private group, the second UE may send a request message (e.g., such as message 414) indicating a request to join the private group. In one configuration, the request message may include the group ID, the private ID, an ID of the second UE, speed of the second UE, direction of the second UE, etc.

At processing stage 556, the group head may confirm or deny the request to join the private group from the second UE. In some configurations, the confirmation or denial may be implicit. In some other configurations, the confirmation or denial may be explicit. For example, the group head may send a confirmation message, e.g., an ACK, to the second UE in response to the joining request as an indication of an approval to join the private group. Similarly, in the event of denial, in some configurations, the group head may send a denial message, e.g., a NACK, to indicate the denial to join the private group. In some configurations, the group head may refrain from sending an approval (ACK) in response to the joining request to implicitly indicate a denial.

FIG. 6A illustrates an example structure of an example announcement message 600 that may be transmitted by a private platooning group head. In one example configuration where the platoon 401 is a private platooning group, the announcement message 40 transmitted by the head UE 406 may have the structure/format of the message 600. As illustrated, the example announcement message 600 includes a public message portion 602 and a private message portion 604. As discussed supra in connection with the examples discussed with reference to FIG. 4, FIG. 5A, and FIG. 5B, the public message portion of the announcement message 600 may include the basic information regarding the private platooning group to which the announcement message 600 corresponds.

For example, box 606 illustrates the information corresponding to the public message portion 602 in one example. As shown, the public message portion 602 may include, for example, one or more of a group ID of the private group, speed of the group or the head or each individual member, direction of the group or the head or each individual member, position/location information for the group or the head or each individual member, information indicating whether to brake and when, information indicating whether to accelerate, when to accelerate and by how much, and a joining request confirmation (e.g., ACK). In addition, the public message portion may further include one or more bits representing a private group indicator/identifier (e.g., information identifying the private group). In contrast, such information identifying a private group may not be present in a group announcement message for a public group.

The private portion 604 of the announcement message 600 may include private information regarding the group including, for example, member IDs corresponding to one or more members, a number of group members, traveling routes, inter-vehicle distance information (e.g., distance between adjacent members), individual vehicle control information (e.g., proposed speed for each group member, position, proposed transmission power for each group member), etc., as illustrated by box 608. As discussed earlier, the private portion 604 may be decoded by the allowed set of UEs that may include members of the private platooning group and one or more UEs that may be allowed to join the private platoon and may have secure information (e.g., such as a private ID or key) corresponding to the private group. The UEs possessing the private ID/key for the private platooning group may descramble the private information in the private portion 604 using the private/key. In some configurations, the private ID/key may be preconfigured in the allowed set of UEs, or distributed by a network node (e.g., base station 180/310 or another node) via scheduling, or sent to the allowed set of UEs via application layer messaging.

FIG. 6B is a diagram 650 illustrating an example of announcement message generation and transmission. As illustrated in the example, in some configurations, to generate the announcement message 600 for a private platooning group, the public message portion 602 (comprising the public information) may be combined (e.g., by the combiner 612) with the private message portion 604. The private message portion 604 may be generated (e.g., by a head of the private platoon) by scrambling private information with a private ID 609 using the scrambler 610. The output of the combiner 612 is the announcement message 600 including the public message portion 602 and the private message portion 604. The output of the combiner 612 (e.g., the announcement message 600) may be subjected (optionally) to one or more of the illustrated processing stages 614, 616, 618, and 620 for further processing prior to transmission. In some configurations, each processing stage may be implemented by one or more corresponding components. In one example configuration, prior to transmission via a transmitter 622, the announcement message 600 may pass through channel coding stage 614 (e.g., for channel coding), modulation stage 616 (e.g., for modulation in accordance with a selected modulation technique), power adjustment stage 618 (e.g., for transmission power control, adjustment or setting), and a waveform stage 620 (e.g., for waveform generation). It should be appreciated that the sequence of processing stages illustrated in FIG. 6B is merely presented as an example and many such different sequences are possible.

Figure 7:
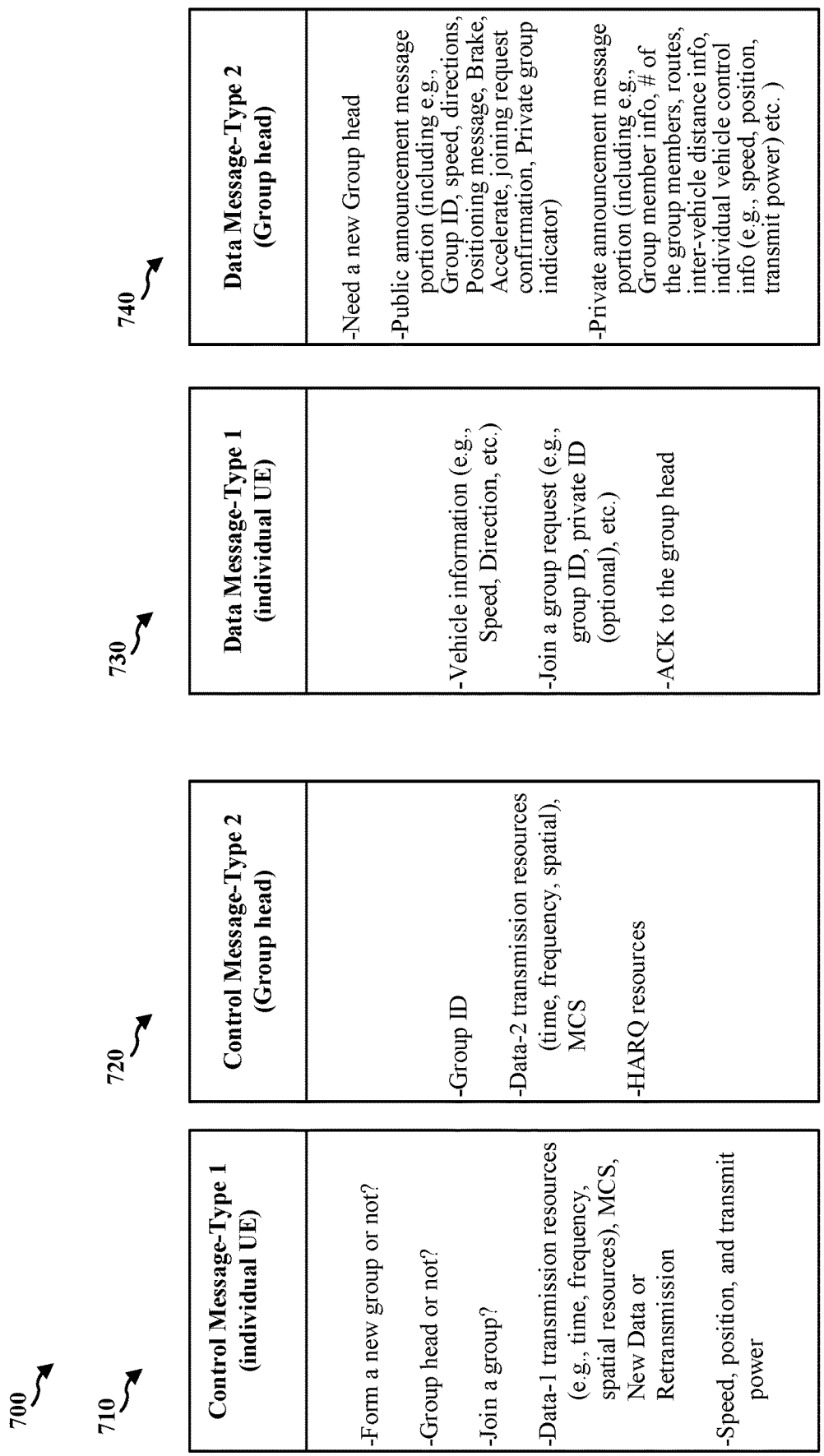
FIG. 7 illustrates two different types of control messages and two different types of data messages that may be used for communication between UEs (e.g. vehicles) in some configurations.

FIG. 7 is a diagram 700 illustrating two different types of control messages and two different types of data messages that may be used for communication between UEs (e.g., vehicles) in some configurations. Multiple types of control messages may be supported, e.g., control message type-1 710 and control message type-2 720, and multiple types of data messages, e.g., data message type 1 730 and data message type 2 740, may be supported. A first type of control message (control message type-1) 710 may be transmitted by individual UEs (e.g., members and head of a platooning group as well as other individual non-member UEs), whereas a second type of control message (control message type-2) 720 may be transmitted by the head of a platooning group. Similarly, a first type of data message (data message type-1) 730 may be transmitted by individual UEs (e.g., members and head of a platooning group as well as other individual non-member UEs), whereas a second type of data message (data, message type-2) 740 may be transmitted by the head of a platooning group.

The control message type-1 710 may include, for example, one or more of the following types of information: an indication to form a platooning group, an indication to be the head of a platooning group, a query/invitation to join a platooning group, transmission resources for the first type of data message (data message type-1), and transmission parameters for the first type of data message. For example, a control message type-1 710 may indicate transmission resources on which a corresponding data message type-1 730 may be transmitted. The transmission resources may comprise one or more of time, frequency and spatial resources. Similarly, the control message type-1 710 may indicate one or more parameters for the corresponding data message type-1 730. For example, the parameters for the first type of data message may comprise one or more of a modulation and coding scheme (MCS), a new data indicator, and a retransmission indicator. As another example, the control message type-1 710 may include the vehicle's speed and/or position. The control message type-1 710 may include a transmit power for the UE, e.g., a transmit power at which the UE transmits communication to the group of UEs.

The control message type-2 720 transmitted by a UE (e.g., group head) may include, for example, one or more of the following information: a group identifier of a platooning group, transmission resources for the second type of data message (data message type-2 740), transmission parameters for the second type of data message, and a HARQ resource indicator. For example, the indicated transmission resources for the second type of data message may comprise one or more of time, frequency and spatial resources, and the indicated transmission parameters may comprise one or more of an MCS, and a retransmission indicator.

The data message type-1 710 transmitted by a UE may include, for example, information indicating one or more of: vehicle information corresponding to the transmitting UE such as speed of the UE, direction of the UE, position of the UE etc., a group identifier for a platooning group when the UE is requesting to join the platooning group, and an ACK to a group head (e.g., in response to a message from the group head). For example, with reference to FIG. 4, the request message 414 transmitted by the head UE 410 may be the data message type-1 730.

The data message type-2 740 transmitted by a UE (e.g., group head) may include one or more of: information indicating a need for a new platooning group head, public information for a platooning group such as a group identifier, a speed of the platooning group, a direction of the platooning group, positioning of the platooning group, a braking indication/instruction, and an acceleration indication/instruction, information indicating a private group, and information indicating an acceptance of a request to join the platooning group; private information for a platooning group such as at least one group member ID, a number of members in the platooning group, inter-vehicle distance information (e.g., distance between adjacent members), individual vehicle control information (e.g., proposed speed for each group member, position, proposed transmission power for each group member), and a route for the platooning group. For example, with reference to FIG. 4, the announcement message 408 and/or the confirmation message 418 transmitted by the group head UE 406 may be the data message type-2 740.

From the perspective of a receiving UE, both types of control messages and data messages may be accessible by the receiving UE whether the receiving UE is the group head, a member, or a non-member UE. Various additional features and aspects are discussed infra in connection with the flowcharts 800 and 900 of FIGS. 8 and 9.

Figure 8:
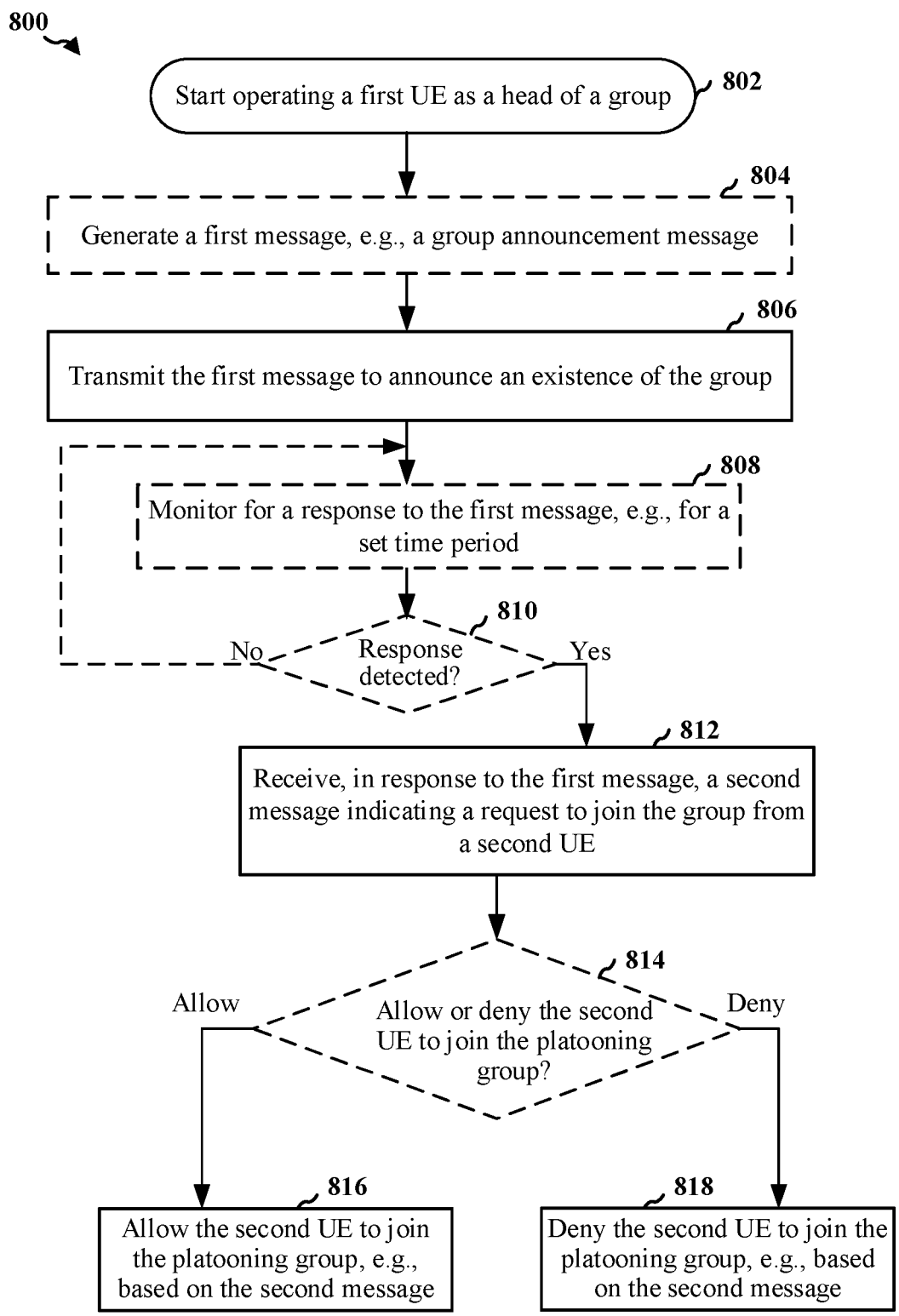
FIG. 8 is a flowchart of a method of wireless communication.

FIG. 8 is a flowchart 800 of a method of wireless communication at a first UE. The method may be performed, for example, by the UE (e.g., UE 104/350/406, the apparatus 1002/1002'; the processing system 1114, which ma comprise memory 1106 and may comprise an entire UE or a component of a UE) which may be the head of a platooning group such as the platooning group 401. Optional aspects are illustrated with a dashed line. To facilitate an understanding of the techniques and concepts described herein, the method of flowchart 800 may be discussed with reference to the example shown in FIG. 4. For discussion purposes, consider that the first UE may be the UE 406 which may be the head of the platooning group 401. At 802, the first UE may be powered on and initialized. Thus, the UE may begin to operate as a head of a group, such as a head of a private platooning group.

At 804, the first UE may generate a first message, e.g., a group announcement message, for announcing the existence of the platooning group. For example, announcement component 1009 of apparatus 1002 may generate a group announcement message. The group may comprise as private platooning group. For example, with reference to FIG. 4, the first message may be the message 408 transmitted by the UE 406.

As discussed supra, if the platooning group headed by the first UE is an open/public group, the first message may be a public message generated such that the full, set of information included therein can be accessed (e.g., can be decoded) by all UEs (e.g., members and non-members of the platooning group) that receive the first message. In such a public platooning group case, first message may comprise one or more of a group identifier of the platooning group, a speed of the platooning group, a direction of the platooning group, positioning information for the platooning group, braking information, acceleration information, at least one identifier (ID) of a member of the platooning group, number of group members in the platooning group, inter-vehicle distance information (e.g., distance between adjacent members), individual vehicle control information (e.g., proposed speed, position, proposed transmission power), and a route of the platooning group.

If the platooning group headed by the first UE is a private group, the first message may be generated with a public message portion (e.g., such as the public portion 602 of the announcement message 600) and a private message portion (e.g., such as the private portion 604). As discussed in detail supra, while the public message portion of the first message may be accessed by members and non-members of the platooning group, the private message portion message comprising private information corresponding to the platoon (e.g., member IDs, a number of members, routes, inter-vehicle distance information, individual vehicle control information (e.g., speed, position, transmission power), etc.) may be scrambled using a private ID/key known to an allowed set of UEs and thus access may be limited to the allowed set of UEs. In a private platooning group, the public message portion may comprise information identifying the private platooning group. Alternatively or additionally, the public message portion may comprise one or more of a group identifier ID of the platooning group, a speed of the platooning group, a direction of the platooning group, positioning information for the platooning group, braking information, or acceleration information. In one example, the information identifying the private group may comprise at least one bit indicating that that the platooning is group is a private group. The private message portion ma comprise private information corresponding to the private platooning group, e.g., including any of at least one identifier (ID) of a member of the platooning group, a number of group members in the platooning group, and/or a route of the platooning group.

At 806, the first message may be transmitted (e.g., broadcast) to announce the existence of the platooning group so that devices and/or vehicles that may be unaware of the presence of the platooning may become aware of the platoon. For example, announcement component 1009 of apparatus 1002 may transmit the message, e.g., via transmission component 1012 of apparatus 1002. For example, with reference to FIG. 4, the first message may correspond to the announcement message 408 transmitted by the UE 406 of the platooning group 401.

Having transmitted the first message, at 808 the first UE may monitor for responses to the first message, e.g., from one or more UEs that may wish to join the platooning group upon becoming aware of the presence of the platoon. For example, reception component 1004 of apparatus 1002 may monitor for responses to the first message, e.g., based on control from control component 1010. In some configurations, the monitoring may be performed for a time period. The time period may be predetermined, or configured by the first UE (e.g., group head) based on a setting, or based on network (e.g., base station) configuration.

At 810, the UE may determine whether a response to the first message is detected, e.g., within the time period. For example, determination component 1008 of apparatus 1002 may determine whether a response to the first message is detected. The operation may proceed based on the determination at block 810. If no response to the first message is detected within the set time period, in one configuration the operation may optionally loop back to block 808 and first UE may continue monitoring for responses for an extended time period.

If a response to the first message is detected at 810, the operation proceeds to block 812. At 812, the first UE may receive from a second UE, in response to the first message, a second message indicating a request to join the platooning group. For example, joining request component 1005 of apparatus 1002 may receive the request. For example, with reference to FIG. 4, the UE 406 may receive the joining application/request message 414 (e.g., the second message) in response to the first message 408. In one configuration, the second message may comprise at least one of the group ID of the platooning group, or a private ID known to the set of allowed UEs (including the members of the platooning group). In some configurations, the second message may further include other information about the second UE 1050, e.g., including any of speed, direction, intended traveling route, and/or additional information regarding the second UE.

Next at 814, the first UE may determine whether to allow or deny the second UE to join the platooning group based on the received second message. Group component 1014 of apparatus 1002 may determine whether to allow or deny the second UE to join. For example, based on the content of the second message and other factors (e.g., number of existing members, direction of the group, speed of the group, traveling route etc.) the first UE may determine whether the second UE should be admitted to the private platooning group. For example, the second message from the second UE may indicate a speed, direction, acceleration, traveling route etc., of the second UE and the first UE may determine whether it may be feasible (e.g., based on comparison of parameters and/or information) to allow the second UE to join the group considering group's speed, direction, acceleration/braking intentions, traveling route etc. Furthermore, in one configuration with a private group, the first UE may also verify if the second message from the second UE includes the private ID known to allowed UEs when deciding to allow or deny the second UE. In one such example of the private group, if the second message does not include the private ID, the first UE may deny entry of the second UE to the private group. Based on the determination, the operation may proceed to either block 816 or block 818.

If the first UE determines to allow the second UE to join, then at 816, the first UE may allow the second UE to join the platooning group. In one configuration, to allow the second UE to join the group, the first UE may send an ACK as an indication for the second UE to join the group. The ACK may be sent as a broadcast or a unicast. For example, confirmation component 1016 may transmit, via transmission component 1012, an ACK.

On the other hand, if the first UE determines that the second UE may not be allowed to join the group, then at 818, the first UE may deny the second UE the opportunity to join the platooning group. The denial may be an implicit denial or an explicit denial (e.g., NACK). For example, confirmation component 1016 may transmit, via transmission component 1012, a NACK.

Figure 9A:
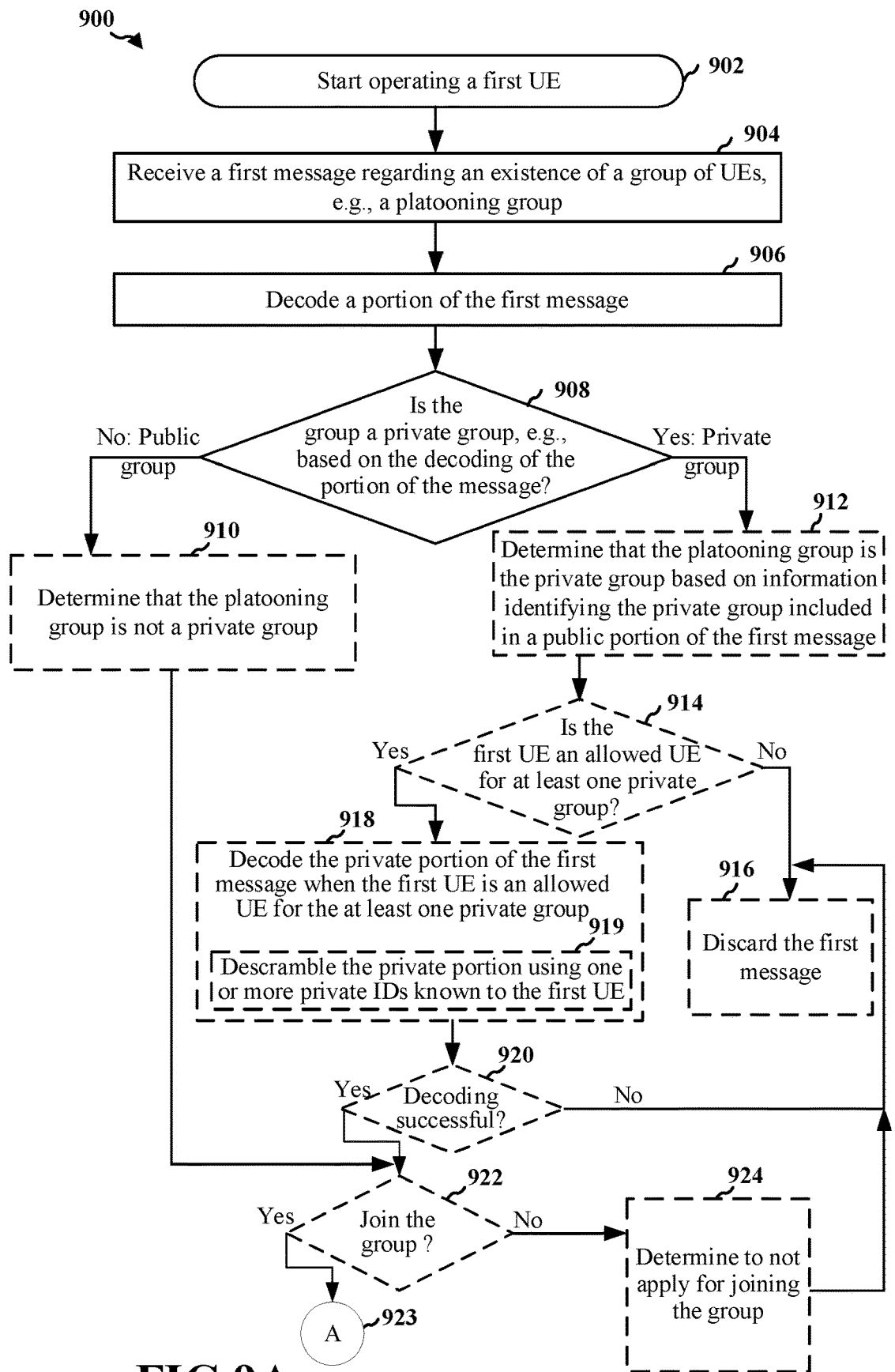
FIG. 9, which comprises a combination of FIG. 9A and FIG. 9B, is a flowchart of another method of wireless communication.
Figure 9B:
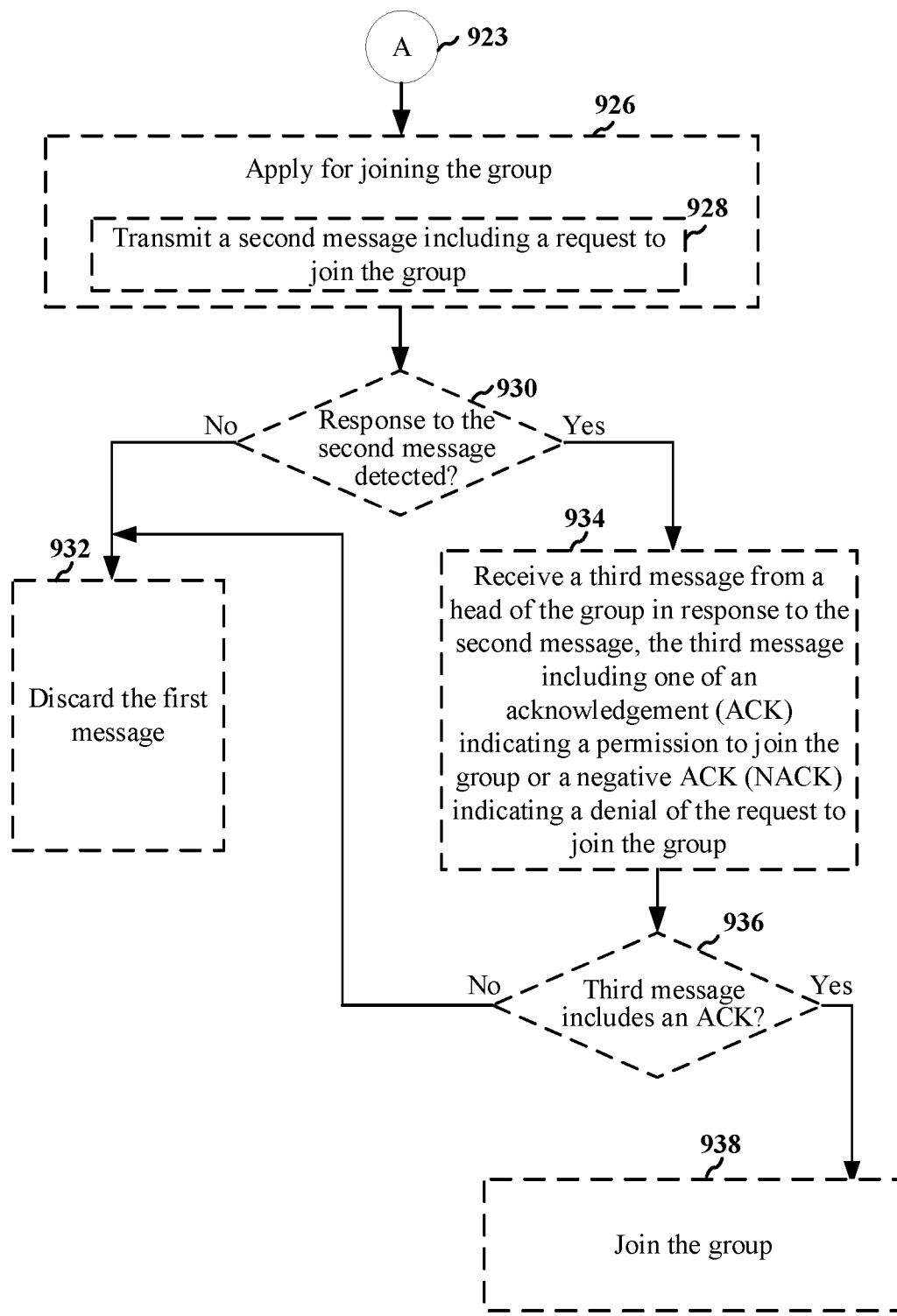

FIG. 9, which comprises a combination of FIG. 9A and FIG. 9B, is a flowchart 900 of a method of wireless communication at a first UE. The method may be performed, for example, by the UE (e.g., UE 104/350/410, the apparatus 1002/1002'; processing system 1114, which may comprise memory 1106 and may correspond to an entire UE or a component of a UE) which may receive a group announcement message from a second UE, e.g., the head of a platooning group such as the platooning group 401. Optional aspects are illustrated with a dashed line. To facilitate an understanding of the techniques and concepts described herein, the method of flowchart 900 may be discussed with reference to the example shown in FIG. 4. For discussion purposes, consider that the first UE may be the UE 410 of FIG. 4. At 902, the first UE may be powered on and initialized.

At 904, the first UE may receive a first message regarding an existence of a group, e.g., a platooning group. For example, reception component 1004 of apparatus may receive the first message. For example, with reference to FIG. 4, the UE 410 may receive a group announcement message 408 from the group head UE 406 indicating an existence of the platooning group 401.

Upon receiving the first message, at 906 the first UE may decode at least a portion of the first message. For example, decoding component 1006 may decode the first message.

In one example, the received first message may be a group announcement message of a public platooning group. In such a case, the first message may be a public message where the full set of information included therein can be accessed (e.g., can be decoded) by all UEs (e.g., members and non-members of the platooning group) that receive the first message. In such a configuration, the portion of the first message that is decoded at 906 may comprise the entire first message.

In another example, the received first message may be a group announcement message of a private platooning group. In such a case, the first message may include a public message portion (e.g., such as the public portion 602 of the announcement message 600) and a private message portion (e.g., such as the private portion 604). As discussed in detail supra, in such a case, while the public message portion of the first message may be decoded by members as well as non-members of the platooning group, the private message portion message comprising private information corresponding to the platoon may be scrambled using a private ID/key known to an allowed set of UEs. Thus, the private message portion of the first message may be decoded by the allowed set of UEs (e.g., including members of the group and other UEs having knowledge of the private ID/key). In such a configuration, the portion of the first message that is decoded at 906 may comprise the public message portion. For either example, based on the decoding at 906, the first UE may be able to determine whether the first message corresponds to a public group or private group.

At 908, the first UE may determine tether the group is a private group based on the decoding of the portion of the message. For example, determination component 1008 of apparatus 1002 may determine whether the group is a private group. For example, in accordance with one aspect, the first message for a private group may include (e.g., in the public message portion) information indicating that the group announcement is for a private group. However, such information might not be present in the first message if the first message is associated with a public group. Accordingly, based on the decoding, if at 908 it is determined that private group identification information or indication is present in the first message, then the operation proceeds to block 910. At 910, the first UE may determine/conclude that the group is not a private group. In other words, the first UE may determine that the group to which the first message corresponds is an open/public group. In some such configurations, the operation proceeds from 910 to 922.

However, if at 908 it is determined that the first message includes information indicating that the group is a private group (e.g., in the public message portion that is decoded) then the operation proceeds to block 912. At 912, the first UE may determine/conclude that the group is the private group based on information identifying the private group included in the public portion of the first message.

Next, at 914, the first UE may determine if the first UE is an allowed UE for at least one private group (e.g., one or more private groups). For example, determination component 1008 may determine whether the first UE is an allowed UE for the private platooning group. For example, the first UE may look up stored information to determine if the UE possesses one or more private IDs/keys corresponding to one or more private groups that may be known, to and/or of interest to the first UE. If the first UE has one or more of such private IDs/keys, it may be considered that the first UE may be an allowed UE for at least the private groups to which the private IDs/keys correspond. If at 914 it is determined that the UE is not an allowed UE for at least one private group, the operation may proceed to block 916 where the first UE may discard the first message. On the other hand, if at 914 it is determined that the UE is an allowed UE for at least one private group, the operation may proceed to block 918.

At 918, the first UE may attempt to decode the private portion of the first message, e.g., when the first UE is an allowed UE for the at least one private group. For example, decoding component 1006 of apparatus 1002 may attempt to decode the private portion. For example, the first UE may attempt to decode the private portion of the first message based on the private IDs/keys of the one or more private groups that the first UE may possess. As discussed supra, the private message portion of the firs message may have been scrambled using a private ID/key corresponding to the private platooning group. Accordingly, as part of the operation of the decoding operation at block 918, at 919 the first UE may attempt to descramble the private message portion using the private IDs/keys known to the first UE.

Next, at 920, the first UE may determine whether the decoding of the private message portion has been successful. For example, determination component 1008 may determine whether the private portion was successfully decoded. In various configurations, the decoding of the private portion of the first message may be considered successful when the descrambling is successful and unsuccessful when the descrambling is unsuccessful. Thus, if the first UE determines that the private message portion is not successfully descrambled (at 919), the first UE may determine that the decoding of the private message portion is unsuccessful and the operation proceeds to 916 where the first message may be discarded. However, if the first UE determines that the private message portion has been successfully descrambled (at 919) then the first UE may determine that the decoding of the private message portion is successful, and the operation proceeds to 922 as illustrated in the flowchart.

Having successfully decoded the private message portion of the first message, the first UE may have the full set of information communicated in the first message (e.g., in the public and private message portions) regarding the private group. For example, the public message portion may comprise one or more of a group identifier of the group, a speed of the group, a direction of the group, positioning information for the group, braking information, and acceleration information, and information identifying the private group. The private message portion may include, for example, one or more of: IDs of one or more members of the group, a number of group members in the group, proposed speed for each group member, proposed transmission power for each group member, distance between adjacent members, and a route of the group. At 922, the first UE may determine whether to apply for joining the group, e.g., based on the information included in the first message and/or additional information or criteria (e.g., preconfigured settings, user selection, etc.) For example, determination component 1008 of apparatus 1002 may determine whether to apply to join. For example, the determination whether to join a public group (e.g., when the first message corresponds to a public group) may be based at least on the content of the first message. Similarly, the determination whether to join a private group (e.g., when the first message corresponds to a private group) may be based at least on the private information in the private portion of the first message. In addition, in some configurations, the determination whether to join the public/private group may be further based on, for example, preconfigured settings (e.g., first UE settings) indicating an interest that the first UE joins one or more particular groups (public or private). Similarly, the determination whether to join the public/private group may be further based on a user selection to join a particular group (public or private). Based on the above discussed information and/or criteria, if at 922 the first UE determines that joining is not desired, the operation may proceed to 924. At 924, the first UE may determine to not apply for joining the group. The operation may proceed from 924 back to 916 where the first message may be discarded.

On the other hand, if at 922 the first UE determines that joining the group is desired (e.g., based on the decoding of the first message and/or other factors discussed above, the operation may proceed to 926 via connecting node A 923.

Having determined that it is desirable to join the group, at 926 the first UE may apply for joining the group. For example, application component 1018 may apply to join the group. In one configuration, the operation of applying for joining the group comprises the first UE transmitting (at 928) a second message, e.g., via transmission component 1012, including a request to join the group, e.g., to a head of the group.

At 930, the first UE may determine whether a response to the second message (request to join) is detected, e.g., from the head of the group. For example, response component 1020 of apparatus 1002 may determine whether the response is received. If no response to the second message is detected, e.g., within a predetermined or set time period, the operation proceeds to 932 where the first UE may discard the first message. For example, no response to the second message may indicate an implicit denial from the head of the group. Accordingly, in some configurations, when no response to the second message is detected within the predetermined time, the first UE may consider that the joining request has been denied. In some other configurations, when no response to the second message is detected, the first UE may decide to transmit the second message again and/or monitor for a response for an extended period of time.

If, at 930, the first UE determines that a response is detected, the operation may proceed to 934. At 934, the first UE may receive a third message (e.g., from the head of the group) in response to the second message. For example, the response component 1020 of apparatus 1002 may receive the third message. In some configurations, the third message may include one of an ACK indicating a permission to join the group or a negative ACK (NACK) indicating a denial of the request to join the group.

Next, at 936, the first UE may determine whether the third message includes an ACK. For example, determination component 1008 of apparatus 1002 may determine whether the third message includes an ACK. If, at 936, it is determined that the third message does not include an ACK (e.g., the third message may include a NACK instead), the operation may proceed to 932 where the first UE may discard the first message assuming a denial of the request to join the group.

If, at 936, it is determined that the third message includes an ACK, the operation may proceed to 938. In various configurations, the third message comprising an ACK may be considered a confirmation (e.g., from the group head) that the first UE is permitted to join the group. Having received a confirmation to join, next at 938 the first UE may join the group and may become a member of the platooning group.

Figure 10:
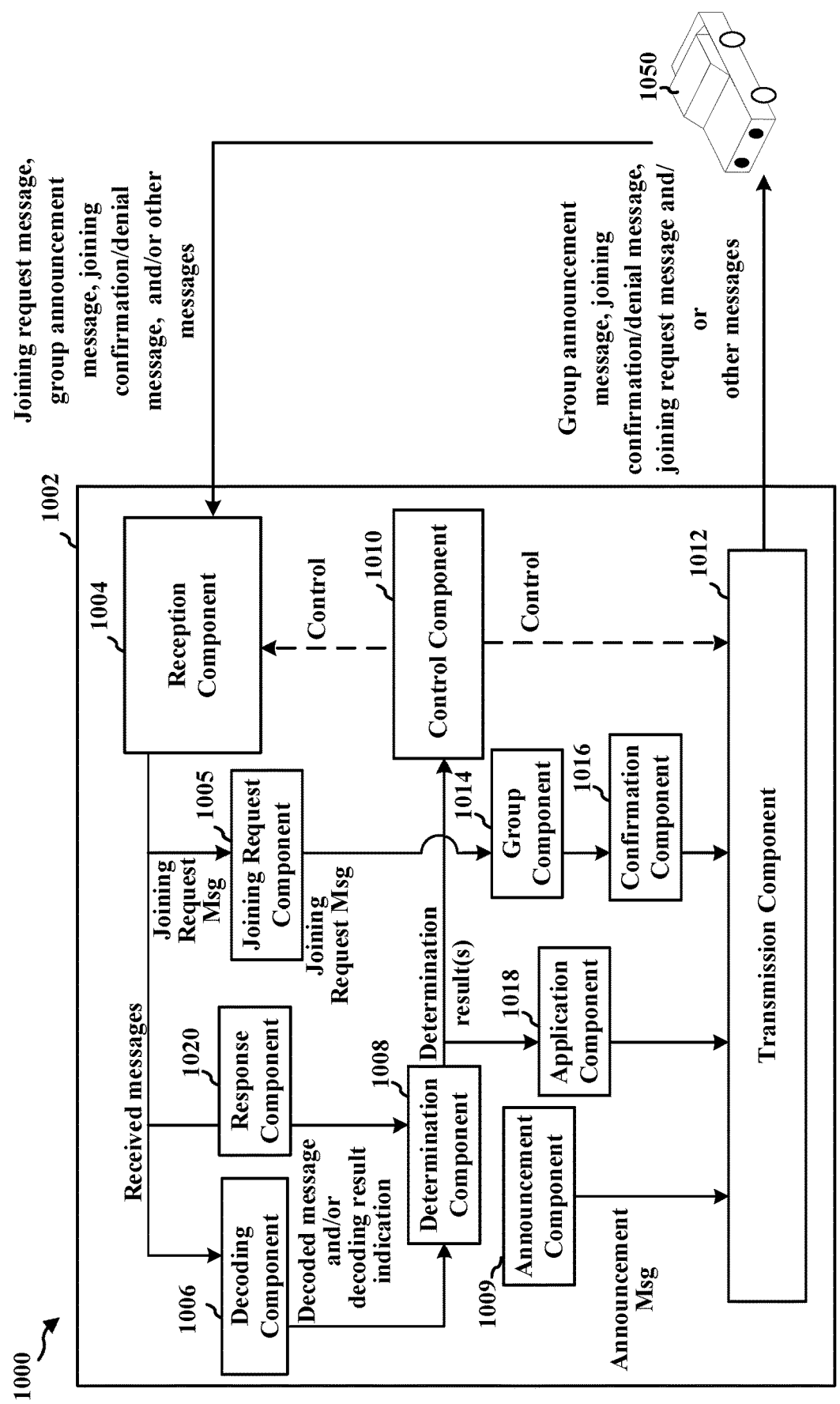
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus 1002 may be a UE, e.g., a first vehicle in a V2V/V2X communication network, that may implement the method of flowcharts 800 and 900. Alternatively, the apparatus 1002 may correspond to a component of a UE. For example, the apparatus may be the UE 406 or UE 410 of FIG. 4. In one configuration, the apparatus 1002 may include a reception component 1004, a joining request component 1005, a decoding component 1006, a determination component 1008, an announcement component 1009, a control component 1010, a transmission component 1012, a group component 1014, a confirmation component 1016, an application component, and a response component 1020. The apparatus 1002 may include additional components that may perform one or more additional operations/functions discussed supra. The apparatus may comprise components configured to perform aspects of the flowcharts in FIGS. 8 and/or FIGS. 9A and 9B. For example, at times, the apparatus may operate as a head of a platooning group, e.g., as described in connection with FIG. 8. At other times, the apparatus may operate as a UE attempting to join a platooning group, as described in connection with FIGS. 9A and 9B.

With reference to FIG. 4, in a first configuration, the apparatus 1002 may be implemented as a first UE 406 (e.g., the head of the platooning group) and the UE 1050 may be the UE 410 (e.g., second UE). In a second configuration discussed later, the apparatus 1002 may be implemented as the UE 410 (e.g., UE that may receive a group announcement message) and the UE 1050 may be the UE 406 (e.g., head of the platooning group). The UE 1050 may include the same or similar components as shown with respect to the apparatus 1002 and discussed below. The apparatus 1002 and the UE 1050 may each be a vehicle or included in a vehicle.

The reception component 1004 may be configured to receive various types of messages described herein (e.g., group announcement message, joining request message, joining confirmation/denial messages, etc.) and/or other information from other devices including UE 1050 (second UE). The messages/information may be received by the reception component 1004 in accordance with the methods discussed supra, including the method of flowcharts 800 and 900. For example, the reception component may receive and process the first type and/or the second type of control and data messages discussed supra. The received messages/information may be provided to one or More components of the apparatus 1002 for further processing and use in performing various operations. For example, in the first configuration, where the apparatus 1002 may be a head of a group such as the UE 406 heading the group 401), the reception component 1004 may be configured to receive a second message indicating a request to join the group from the UE 1050 (e.g., the second UE 410). The second message may be in response to a first message (e.g., group announcement message 408) from the apparatus 1002 to announce an existence of the group as discussed below in connection with the transmission Component 1012. In some configurations, the reception component 1004 may operate in combination with and/or under the control of the control component 1010. For example, in some configurations, the control component 1010 may control the reception component 1004 to monitor for a response to the first message for a preconfigured or set time period, e.g., in accordance with the method of flowchart 800. In one example, where the apparatus 1002 may be the head of the group, the joining request component 1005 may be configured to receive and process the second message (e.g., joining request message) indicating the request to join the group via the reception component 1004. In another example, where the apparatus 1002 may be a non-member UE that intends to join the platooning group, the joining request component 1005 may generate the joining request message and transmit, via the transmission component 1012) to the head of the platooning group.

The transmission component 1012 may be configured to transmit messages and/or other information to one or more external devices including, e.g., UE 1050. In some configurations, the transmission component 1012 may operate in combination with and/or under the control of the control component 1010. The messages/information may be transmitted by the transmission component 1012 in accordance with the methods discussed supra including the method of flowcharts 800 and 900. For example, the transmission component may generate and transmit the first type and or the second type of control and data messages discussed supra. In some other configurations, the first type and/or the second type of control and data messages may be generated by other components and transmitted via the transmission component 1012. For example, in some configurations, when implemented as a head of a group (e.g., such as the 406 heading the group 401), the announcement component 1009 may be configured to transmit, e.g., via the transmission component 1012, the first message (e.g., group announcement message 408) to announce an existence of the group. As discussed supra, if the platooning group to which the first message corresponds is an open/public group, the first message may be a public message generated (e.g., by the announcement component 1009 and/or transmission component 1012) such that the full set of information included therein can be accessed (e.g., can be decoded) by both members and non-members of the platooning group that may receive the first message. However, if the platooning group is a private group, the first message may be generated (by the announcement component 1009 and/or the transmission component 1012) with a public message portion (e.g., such as the public portion 602 of the announcement message 600) and a private message portion (e.g., such is the private portion 604).

The decoding component 1006 may be configured to decode received messages in accordance with the methods of flowchart 800 and 900 discussed supra, and as discussed further below. The decoded messages/information and/or an indication of the decoding result (e.g., success/failure) may be provided to one or more components of the apparatus 1002 for further processing and use in performing various operations in accordance with the methods described supra.

In one configuration, where the apparatus 1002 is implemented as the head of the group, the group component 1014 may be configured to determine whether to allow or deny the UE 1050 (e.g., second UE) to join the group based on the received second message. The determination result (e.g., whether to allow or deny joining) may be provided to the confirmation component 1016, control component 1010 and/or transmission component 1012 and/or other components for further action. Depending on the implementation, in some configurations, the transmission component 1012 (alone, in combination with confirmation component 1016) may send a confirmation message to the UE 1050 indicating that the UE 1050 is allowed to join to the group when it is determined to allow the UE 1050 to join the group. Similarly, in some configurations, the transmission component 1012 (alone, in combination with and/or under the control of the confirmation component 1016) may send a denial message to the UE 1050 indicating that the UE 1050 is denied admission to the group when it is determined to not allow the UE 1050 to join the group.

In the second configuration, the apparatus 1002 may be implemented as the UE 410 (e.g., first UE) that may be looking to join to a platooning group and the UE 1050 may be the UE 406 (e.g., second UE which may be the head of the platooning group). In such a configuration, the reception component 1004 may be configured to receive the first message (e.g., group announcement message) regarding an existence of the platooning group from the UE 1050 (e.g., the second UE 406) which may be the head of the platooning group.

The decoding component 1006 may be configured to decode at least a portion of the first message. For example, in case of a public group the portion may comprise the full first message that may be decoded. In another example case of the private group, the portion may comprise the public portion of the first message that may be decoded by the decoding component 1006. The decoding output may be provided to the determination component 1008.

Based on the decoded portion of the first message, the determination component 1008 may determine whether the group is the private group or public group. In one example of a private group, the determination component 1008 may determine that the group is the private group based on information identifying the private group included in the public portion of the first message. In such an example, the determination component 1008 may be further configured to determine whether the apparatus 1002 is an allowed UE for at least one private group. In such an example, the decoding component 1006 may be further configured to decode the private portion of the first message when the apparatus is determined to be an allowed UE for the at least one private group. In various configurations, the decoding component may be further configured to attempt to descramble the private portion of the first message using one or more private IDs known to the first UE as part of decoding the private message portion. The decoding component 1008 may be further configured to determine whether the decoding of the private portion of the first message is successful (e.g., based on cyclic redundancy check (CRC) or other criteria). In one aspect, the decoding component 1008 may be configured to determine that the decoding of the private portion of the first message is successful when the descrambling is successful, and that the decoding of the private portion is unsuccessful when the descrambling is unsuccessful. In various configuration, the decoding output (e.g., decoded information) and/or decoding result indications (e.g., decoding success or failure) may be provided to the determination component 1008 and/or other components for use in taking further action in accordance with the described methods. In some configurations, the determination component 1008 may be further configured to discard the first message when the private message portion fails decoding. In some such configurations, the determination component 1008 may be further configured to determine whether to apply for joining the group based on whether the decoding of the private portion of the first message is successful.

In some configurations, when the private message portion is successfully decoded, the application 1018 may be configured to determine whether to apply for joining the group further based on private information of the group in the private portion of the first message and optionally further based on group joining preference settings (stored in the apparatus 1002) or user selection. For example, if the private information matches a joining preference of the apparatus 1002, the application component 1018 may be configured to determine to apply for joining the group. Similarly, in some examples, if the private information does not match a joining setting of the apparatus 1002, the application component 1018 may be configured to determine to not apply for joining the group. In some such cases where the determination is to not apply for joining the group, the first message may be discarded. In various configurations, the determination result(s) may be provided to the control component 1010 and/or the transmission component 1012.

In some configurations, based on the determination result(s) from the application component 1018 and optionally further based on a setting or user selection, the control component 1010 and/or the transmission component 1012 (alone or in combination) may be configured to apply for joining the group. As part of applying for joining the group, the transmission component 1012 may be further configured to transmit a second message including a request to join the group, e.g., to the UE 1050.

In some configurations, upon transmission of the second message, the reception component 1004 alone, in combination with, or under the control of the response component 1020, may monitor for a response to the second message from the UE 1050. In one configuration, the reception component may receive a third message from a head of the group (e.g., UE 1050) in response to the second message.

The third message may include one of an ACK indicating a permission to join the group or a NACK indicating a denial of the request to join the group. In some such configurations, the control component 1010 may control the apparatus 1002 to join the group when the third message includes the ACK, and may discard the first message when the third message includes the NACK.

The apparatus may include additional components that perform each of the blocks of the algorithm in the aforementioned flowcharts of FIG. 8 and FIG. 9. As such, each block in the aforementioned flowcharts of FIG. 8 and FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
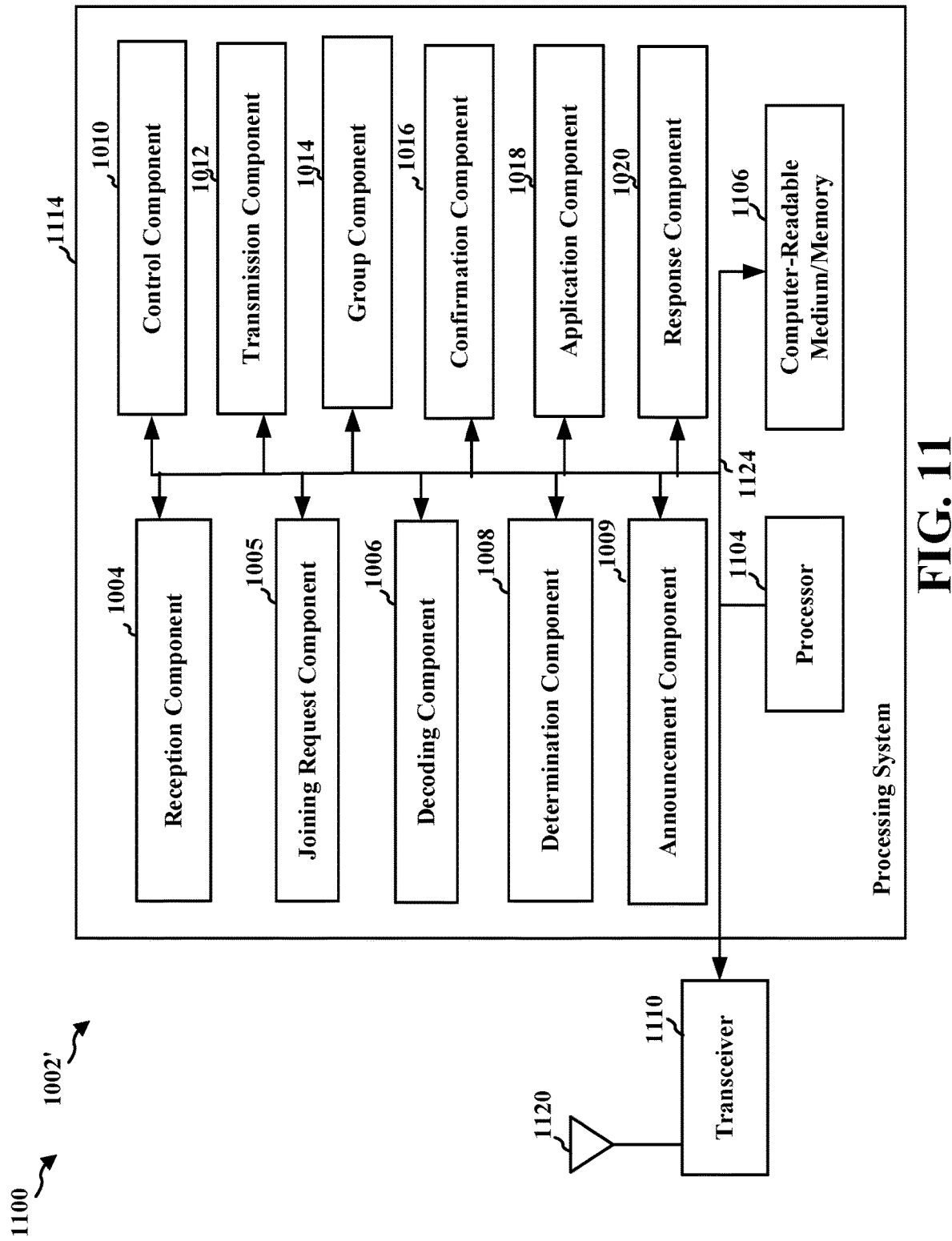
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1005, 1006, 1008, 1009, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1005, 1006, 1008, 1009, 1010, 1012. The components may be software components running in the processor 1104, resident/stored in the computer readable medium/memory 1106, one or more hardware components coupled to the processor 1104, or some combination thereof. In one configuration, the processing system 1114 may be a component of the UE 350 and may include the memory 360 and/or at least one of the TX processor 368, the RX processor 356, and the controller/processor 359. Alternatively, the processing system 1114 may comprise the entire UE.

In a first configuration, the apparatus 1002/1002' may be a first UE for wireless communication (e.g., UE 406) including means for transmitting a first message to announce an existence of a platooning group. The apparatus 1002/1002' may further comprise means for receiving a second message indicating a request to join the platooning group from a second UE (e.g., UE 410), the second message ma be in response to the first message. In some configurations, the apparatus 1002/1002 may further comprise means for allowing or denying the second UE to join the platooning group based on the second message.

In one example, the means for allowing or denying may be configured to allow the second UE to join the platooning group based on the second message. In such a case, the means for transmitting may be further configured to send a denial message to the second UE indicating that the second UE is denied admission to the platooning group. In one another example, the means for allowing or denying may be configured to deny the second UE to join the platooning group based on the second message. In such an example, the means for transmitting is further configured to send a denial message to the second UE indicating that the second UE is denied admission to the platooning group.

In a second configuration, the apparatus 1002/1002' may be a first UE (e.g., UE 410) that may receive a group announcement message from a second UE (e.g., UE 406 which may be the head of a platooning group). In this configuration, the apparatus 1002/1002' may comprise means for receiving a first message indicating an existence of a platooning group. The apparatus 1002/1002' may further comprise means for decoding at least a portion of the first message and means for determining whether the platooning group is a private group based on the decoding.

In one example, the portion may comprise a public portion of the first message. In such an example, the means for determining may be further configured to determine that the platooning group is the private group based on information identifying the private group included in the public portion of the first message, and determine whether the first UE (the apparatus 1002/1002') is an allowed UE for at least one private group. In one such example, the first message may further comprise a private portion of the first message. In such an example, the means for decoding may be further configured to decode the private portion of the first message when the first UE is an allowed UE for the at least one private group, and the means for determining may be further configured to determine whether to apply for joining the platooning group based on whether the decoding of the private portion of the first message is successful.

In one example, the private portion of the received first message may be scrambled with a private ID. In such an example, the means for decoding may be further configured to descramble the private portion using one or more private IDs known to the first UE (the apparatus 1002/1002') as part of decoding the private portion of the first message. The means for decoding may be further configured to determine that the decoding of the private portion of the first message is successful when the descrambling is successful and determine that the decoding of the private portion of the first message is unsuccessful when the descrambling is unsuccessful.

In one example, the private portion of the first message may comprise private information corresponding to the platooning group. In such an example, the means for determining may be further configured to determine, when the private portion of the first message is successfully decoded, whether to apply for joining the platooning group further based on the private information in the private portion of the first message and based on a setting or user selection at the first UE (the apparatus 1002/1002').

In the second configuration, the apparatus 1002/1002' may further comprise means for transmitting a second message including a request to join the group (e.g., to the second UE), the second message being transmitted when it is determined to apply for joining the platooning group. The means for determining may be further configured to discard the first message when it is determined to not apply for joining the platooning group. In one example, the means for receiving may be further configured to receive a third message from a head of the platooning group in response to the second message, the third message including one of an ACK indicating a permission to join the platooning group or a NACK indicating a denial of the request to join the platooning group. In such an example, the apparatus 1002/1002' may further comprise means for controlling the apparatus to join the platooning group when the third message includes the ACK and discard the first message when the third message includes the NACK.

In one example, the first message may be a public message corresponding to an open/public platooning group accessible by both non-members and members of the platooning group. In such an example, the means for determining may determine, based on the decoding of the portion of the first message, that the platooning, group is not the private group.

The aforementioned means may be one or more of the aforementioned components of the apparatus 1002 and/or the processing system 1114 of the apparatus 1002 configured to perform the functions recited by the aforementioned means. As described supra, in one configuration the processing system 1114 may include the TX Processor 368, the RX Processor 356, and the controller/processor 359. As such, in one configuration, the aforementioned means may be the TX Processor 368, the RX Processor 356, and the controller: processor 359 configured to perform the functions recited by the aforementioned means.

Example 1 is a method of wireless communication at a first UE that includes transmitting a first message to announce an existence of a platooning group, receiving a second message indicating a request to join the platooning group from a second UE in response to the first message, and allowing or denying the second UE to join the platooning group based on the second message.

In Example 2, the method of the example 1 further includes that the first UE comprises a first vehicle and the second UE comprises a second vehicle.

In Example 3, the method of any of examples 1-2 further includes that the first vehicle, the second vehicle, and the platooning group are part of a V2V communication network.

In Example 4, the method of any of examples 1-3 further includes that the platooning group is a private group and the first UE is the head of the platooning group, and that the first message comprises a public message portion accessible by both non-members and members of the platooning group and a private message portion accessible by a set of allowed UI for the platooning group.

In Example 5, the method of any of examples 1-4 further includes that the set of allowed UEs include both members of the platooning group and non-member UE having a private ID associated with the platooning group.

In Example 6, the method of any of examples 1-5 further includes that the public message portion comprises: i) one or more of a group identifier (ID) of the platooning group, a speed of the platooning group, a direction of the platooning group, positioning information for the platooning group, braking information, and acceleration information, and ii) information identifying the private group.

In Example 7, the method of any of examples 1-6 further includes that the second message comprises at least one of the group ID of the platooning group, or a private ID known to the set of allowed UEs or the members of the platooning group.

In Example 8, the method of any of examples 1-7 further includes that the information identifying the private group comprises at least one bit indicating that that the platooning group is a private group.

In Example 9, the method of any of examples 1-8 further includes that the private message portion comprises private information corresponding to the platooning group, the private information comprising one or more of: at least one identifier (ID) of a member of the platooning group, proposed speed for each group member, proposed transmission power for each group member, distance between adjacent members, a number of group members in the platooning group, and a route of the platooning group.

In Example 10, the method of any of examples 1-9 further includes that the private message portion is generated by scrambling the private information with a private ID known to the set of allowed UEs for the platooning group.

In Example 11, the method of any of examples 1-10 further includes that the private ID is pre-stored in the first UE.

In Example 12, the method of any of examples 1-11 further includes that the private ID is configured by one of a network node or a UE via a lower layer scheduling message or a higher layer message.

In Example 13, the method of any of examples 1-12 further includes that the allowing or denying the second UE to join the platooning group comprises: determining to allow the second UE to join the platooning group, and sending a confirmation message to the second UE indicating that the second UE is admitted to the platooning group.

In Example 14, the method of any of examples 1-13 further includes that the allowing or denying the second UE to join the platooning group comprises: determining to deny the second UE to join the platooning group, and sending a denial message to the second UE indicating that the second UE is denied admission to the platooning group.

In Example 15, the method of any of examples 1-14 further includes that the first UE is a head of the platooning group, the platooning group is an open public group, and the first message is a public message comprising: one or more of a group identifier of the platooning group, a speed of the platooning group, a direction of the platooning group, positioning information for the platooning group, braking information, acceleration information, at least one identifier (ID) of a member of the platooning group, number of group members in the platooning group, proposed speed for each group member, proposed transmission power for each group member, distance between adjacent members, and a route of the platooning group.

In Example 16, the method of any of examples 1-15 further includes that the first message is accessible by both non-members and members of the platooning group.

Example 17 is a system or apparatus including means for implementing a method or realizing an apparatus as in any of examples 1-16.

Example 18 is a device including one or more processors and memory in electronic communication with the one or more processors storing instructions executable by the one or more processors to cause the system or apparatus to implement a method as in any of examples 1-16.

Example 19 is a non-transitory computer readable medium storing instructions executable by one or more processors to cause the one or more processors to implement a method as in any of examples 1-16.

Example 20 is a method of wireless communication at a first UE that includes receiving a first message indicating an existence of a platooning group, decoding a portion of the first message, and determining whether the platooning group is a private group based on the decoding.

In Example 21, the method of the example 20 further includes that the first message is from a second UE, the first UE comprises a first vehicle, and the second UE comprises a second vehicle.

In Example 22, the method of any of examples 20-21 further includes that the first vehicle, the second vehicle, and the platooning group are part of a V2V communication network.

In Example 23, the method of any of examples 20-22 further includes that the portion comprises a public portion of the first message, and further includes determining that the platooning group is the private group based on information identifying the private group included in the public portion of the first message, and determining whether the first UE is an allowed UE for at least one private group.

In Example 24, the method of any of examples 20-23 further includes that the first message thither comprises a private portion of the first message, and further includes decoding the private portion of the first message when the first UE is an allowed UE for the at least one private group, and determining whether to apply for joining the platooning group based on whether the decoding of the private portion of the first message is successful.

In Example 25, the method of any of examples 20-24 further includes that the private portion of the first message is scrambled with a private ID, and further includes descrambling the private portion using one or more private IDs known to the first UE as part of decoding the private portion of the first message, determining that the decoding of the private portion of the first message is successful when the descrambling is successful, and determining that the decoding of the private portion of the first message is unsuccessful when the descrambling is unsuccessful.

In Example 26, the method of any of examples 20-25 further includes that the private portion of the first message comprises private information corresponding to the platooning group, and further includes determining, upon successful decoding of the private portion of the first message, whether to apply for joining the platooning group further based on the private information in the private portion of the first message.

In Example 27, the method of any of examples 20-26 further includes applying for joining the platooning group based on a setting or user selection, wherein applying for joining the platooning group comprises transmitting a second message including a request to join the platooning group.

In Example 28, the method of any of examples 20-27 further includes receiving a third message from a head of the &tootling group in response to the second message, the third message including one of an ACK indicating a permission to join the platooning group or a NACK indicating a denial of the request to join the platooning group, joining the platooning group when the third message includes the ACK, and discarding the first message when the third message includes the NACK.

In Example 29 the method of any of examples 20-28 further includes determining to not apply for joining the platooning group based on a setting or user selection at the first UE, and discarding the first message.

In Example 30, the method of any of examples 20-29 further includes that the first message is a group announcement message from a head of the platooning group.

In example 31, the method of any of examples 20-30 further includes that the public portion of the first message is accessible by both non-members and members of the platooning group, and the private portion is accessible by a set of allowed UEs for the platooning group.

In Example 32, the method of any of examples 20-31 further includes that the public portion of the first message comprises: i) one or more of a group identifier of the platooning group, a speed of the platooning group, a direction of the platooning group, positioning information for the platooning group, braking information, and acceleration information, and ii) the information identifying the private group.

In Example 33, the method of any of examples 20-32 further includes that the information identifying the private group comprises a single bit indicating that the platooning group is a private group.

In Example 34, the method of any of examples 20-33 further includes that the private portion comprises one or more of: at least one identifier (ID) of a member of the platooning group, a number of group members in the platooning group, proposed speed for each group member, proposed transmission power for each group member, distance between adjacent members, and a mute of the platooning group.

In Example 35, the method of any of examples 20-34 further includes that the first message is a public message comprising one or more of a group identifier of the platooning group, a speed of the platooning group, a direction of the platooning group, positioning information for the platooning group, braking information, acceleration information, at least one identifier (ID) of a member of the platooning group, number of group members in the group, and a route of the platooning group.

In Example 36, the method of any of examples 20-35 further includes that the first message is accessible by both non-members and members of the platooning group.

Example 37 is a system or apparatus including means for implementing a method or realizing an apparatus as in any of examples 20-36.

Example 38 is a device including one or more processors and memory in electronic communication with the one or more processors storing instructions executable by the one or more processors to cause the system or apparatus to implement a method as in any of examples 20-36.

Example 39 is a non-transitory computer readable medium storing instructions executable by one or more processors to cause the one or more processors to implement a method as in any of examples 20-36.

While some specific examples are discussed above, it should be appreciated that many variations are possible. The features discussed in the above examples 1-39 may also be used in combination with any of the other configurations, aspects and/or features discussed herein.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A. B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
    transmitting a first message to announce an existence of a private platooning group, wherein the first message comprises a public message portion that is accessible by both non-members of the private platooning group and members of the private platooning group, and a private message portion that is accessible by a set of allowed UEs for the private platooning group;
    receiving, in response to the first message, a second message indicating a request to join the private platooning group from a second UE; and
    allowing or denying the second UE to join the private platooning group based on the second message.

2. The method of claim 1, wherein the first UE is a head of the private platooning group.

3. The method of claim 1, wherein the set of allowed UEs include both the members of the private platooning group and a non-member UE having a private identifier (ID) associated with the private platooning group.

4. The method of claim 1, wherein the public message portion comprises information identifying the private platooning group as a private group and at least one of:
    a group identifier (ID) of the private platooning group, a speed of the private platooning group,
    a direction of the private platooning group,
    positioning information for the private platooning group,
    braking information for the private platooning group, or
    acceleration information for the private platooning group.

5. The method of claim 4, wherein the second message indicating the request to join the private platooning group comprises at least one of the group ID of the private platooning group or a private ID known to the set of allowed UEs or the members of the private platooning group.

6. The method of claim 4, wherein the information identifying the private platooning group as the private group comprises at least one bit indicating the private group.

7. The method of claim 1, wherein the private message portion comprises private information corresponding to the private platooning group, the private information comprising at least one of:
    an identifier (ID) of a member of the private platooning group,
    a proposed speed for each group member,
    a proposed transmission power for each group member,
    a distance between adjacent members in the private platooning group,
    a number of group members in the private platooning group, or
    a route of the private platooning group.

8. The method of claim 1, wherein the private message portion is generated by scrambling private information with a private identifier (ID) known to the set of allowed UEs for the private platooning group.

9. The method of claim 8, wherein the private ID is pre-stored in the first UE.

10. The method of claim 8, wherein the private ID is configured by one of a network node or a UE via a lower layer scheduling message or a higher layer message.

11. The method of claim 1, wherein the first UE, the second UE, and the private platooning group are part of a vehicle-to-vehicle (V2V) communication network.

12. A first user equipment (UE), comprising:
    a memory; and
    at least one processor coupled to the memory and configured to:
        transmit a first message to announce an existence of a private platooning group, wherein the first message comprises a public message portion that is accessible by both non-members and members of the private platooning group, and a private message portion that is accessible by a set of allowed UEs for the private platooning group;
        receive, in response to the first message, a second message indicating a request to join the private platooning group from a second UE; and
        allow or deny the second UE to join the private platooning group based on the second message.

13. The first UE of claim 12, wherein the first UE is a head of the private platooning group.

14. The first UE of claim 12, wherein the set of allowed UEs include both the members of the private platooning group and a non-member UE having a private identifier (ID) associated with the private platooning group.

15. The first UE of claim 12, wherein the public message portion comprises information identifying the private platooning group as a private group and at least one of:

a group identifier (ID) of the private platooning group, a
    speed of the private platooning group,
a direction of the private platooning group,
positioning information for the private platooning group,
braking information for the private platooning group, or
acceleration information for the private platooning group.

16. The first UE of claim 12, wherein the private message portion comprises private information corresponding to the private platooning group, the private information comprising at least one of:
    at least one identifier (ID) of a member of the private platooning group,
    a proposed speed for each group member,
    a proposed transmission power for each group member,
    a distance between adjacent members,
    a number of group members in the private platooning group, or
    a route of the private platooning group.

17. The first UE of claim 12, wherein the second message indicating the request to join the private platooning group comprises at least one of a group identifier (ID) of the private platooning group or a private ID known to the set of allowed UEs or the members of the private platooning group.

18. The first UE of claim 17, wherein the private message portion is generated by scrambling private information with the private ID known to the set of allowed UEs for the private platooning group.

19. A method of joining a private platooning group at a first user equipment (UE), comprising:
    receiving a first message indicating an existence of the private platooning group, wherein the first message comprises a public portion that is accessible by both non-members and members of the private platooning group, and a private portion that is accessible by a set of allowed UEs for the private platooning group;
    decoding a portion of the first message; and
    determining that the private platooning group is a private group based on the decoding.

20. The method of claim 19, wherein the portion comprises the public portion of the first message, the method further comprising:
    determining that the private platooning group is the private group based on information identifying the private group included in the public portion of the first message; and
    determining whether the first UE is an allowed UE for at least one private group.

21. The method of claim 20, the method further comprising:
    decoding the private portion of the first message when the first UE is the allowed UE for the at least one private group; and
    determining whether to apply for joining the private platooning group based on whether the decoding of the private portion of the first message is successful.

22. The method of claim 21, wherein the private portion of the first message is scrambled with a private identifier (ID); and
    wherein the decoding the private portion of the first message comprises:
        descrambling the private portion using one or more private IDs known to the first UE.

23. The method of claim 21, wherein the private portion of the first message comprises private information corresponding to the private platooning group, the method further comprising:

determining, upon successful decoding of the private portion of the first message, whether to apply for joining the private platooning group further based on the private information in the private portion of the first message; and
transmitting a second message including a request to join the private platooning group when the UE determines to apply for joining the private platooning group.

24. The method of claim 21, wherein the private portion comprises at least one of:
    at least one identifier (ID) of a member of the private platooning group,
    a number of group members in the private platooning group,
    a proposed speed for each group member,
    a proposed transmission power for each group member,
    a distance between adjacent members, or
    a route of the private platooning group.

25. The method of claim 20, wherein the public portion comprises the information identifying the private group and at least one of:
    a group identifier of the private platooning group,
    a speed of the private platooning group,
    a direction of the private platooning group,
    positioning information for the private platooning group,
    braking information, or
    acceleration information.

26. A first user equipment (UE), comprising:
    a memory; and
    at least one processor coupled to the memory and configured to:
        receive a first message indicating an existence of a private platooning group, wherein the first message comprises a public portion that is accessible by both non-members and members of the private platooning group, and a private portion that is accessible by a set of allowed UEs for the private platooning group;
        decode a portion of the first message; and
        determine whether the private platooning group is a private group based on the decoding.

27. The first UE of claim 26, wherein the portion comprises the public portion of the first message, wherein the at least one processor is further configured to:
    determine that the private platooning group is the private group based on information identifying the private group included in the public portion of the first message; and
    determine whether the first UE is an allowed UE for at least one private group.

28. The first UE of claim 27, wherein the at least one processor is further configured to:
    decode the private portion of the first message when the first UE is the allowed UE for the at least one private group; and
    determine whether to apply for joining the private platooning group based on whether the decoding of the private portion of the first message is successful.

29. The first UE of claim 28, wherein the private portion of the first message is scrambled with a private identifier (ID), wherein the at least one processor is further configured to:
    descramble the private portion using one or more private IDs known to the first UE.

30. The first UE of claim 28, wherein the private portion of the first message comprises private information corresponding to the private platooning group, wherein the at least one processor is further configured to:

determine, upon successful decoding of the private portion of the first message, whether to apply for joining the private platooning group further based on the private information in the private portion of the first message; and transmit a second message including a request to join the private platooning group when the UE determines to apply for joining the private platooning group.

\* \* \* \* \*